US008204870B2

(12) United States Patent
Mukkamala et al.

(10) Patent No.: US 8,204,870 B2
(45) Date of Patent: Jun. 19, 2012

(54) UNWIRED ENTERPRISE PLATFORM

(75) Inventors: Himagiri Mukkamala, Pleasanton, CA (US); Geno Coschi, Ontario (CA); Sudipto Rai Chowdhuri, San Ramon, CA (US); David Clegg, Altadena, CA (US); Michael M. Ho, Dublin, CA (US); Evan Ireland, Wellington (NZ); Kyle Leckie, Ontario (CA); Andrew Lee, Ontario (CA); Samir Nigam, Dublin, CA (US); Rudi Seitz, Boston, MA (US)

(73) Assignee: Sybase, Inc., Dublin, CA (US)

( * ) Notice: Subject to any disclaimer, the term of this patent is extended or adjusted under 35 U.S.C. 154(b) by 268 days.

(21) Appl. No.: 11/882,749

(22) Filed: Aug. 3, 2007

(65) Prior Publication Data
US 2009/0037430 A1 Feb. 5, 2009

(51) Int. Cl.
*G06F 17/30* (2006.01)
(52) U.S. Cl. ...................................... 707/705
(58) Field of Classification Search .......... 707/8, 201, 707/610, 621, 913, 918, 944, 999.01, 607, 707/999.201, 705; 709/248; 713/375, 400
See application file for complete search history.

(56) References Cited

U.S. PATENT DOCUMENTS

| | | | |
|---|---|---|---|
| 5,857,201 A | 1/1999 | Wright, Jr. et al. |
| 6,018,762 A | 1/2000 | Brunson et al. |
| 6,073,163 A | 6/2000 | Clark et al. |
| 6,089,454 A | 7/2000 | Sadler |
| 6,425,017 B1 | 7/2002 | Dievendorff et al. |
| 6,449,657 B2 | 9/2002 | Stanbach, Jr. et al. |
| 6,477,565 B1 | 11/2002 | Daswani et al. |
| 6,539,381 B1 | 3/2003 | Prasad et al. |
| 6,567,864 B1 | 5/2003 | Klein |
| 6,584,548 B1 | 6/2003 | Bourne et al. |
| 6,636,873 B1 | 10/2003 | Merchant et al. |
| 6,636,886 B1 | 10/2003 | Katiyar et al. |
| 6,728,702 B1 | 4/2004 | Subramaniam et al. |
| 6,769,032 B1 | 7/2004 | Katiyar et al. |
| 6,792,046 B2 | 9/2004 | Hatano et al. |
| 6,820,116 B1 | 11/2004 | Pyhalammi et al. |
| 6,842,906 B1 | 1/2005 | Bowman-Amuah |

(Continued)

FOREIGN PATENT DOCUMENTS

| | | |
|---|---|---|
| EP | 1016987 A2 | 7/2000 |
| EP | 1271362 A2 | 1/2003 |
| WO | WO 99/30295 A1 | 6/1999 |

OTHER PUBLICATIONS

Judith Gebauer, Success Factors and Impacts of Mobil Business Applications: Results From A Mobile E-Procurement Study, Dec. 29, 2003, International Journal of Electronic Commerce.*

(Continued)

*Primary Examiner* — Thu-Nguyet Le
(74) *Attorney, Agent, or Firm* — Sterne, Kessler, Goldstein & Fox P.L.L.C.

(57) ABSTRACT

Systems, methods and computer program products for inherently integrating mobility with an enterprise are described herein. Enterprise data is accessed from one or more data sources, wherein such data sources may comprise structured and unstructured data sources. The data is transferred from the enterprise to a plurality of mobile devices over a plurality of diverse networks. In an embodiment, such transfer takes into consideration characteristics of the diverse networks. The enterprise receives data generated by mobile devices while performing enterprise-related operations at the wireless edge. The enterprise responds to environmental changes using the received data.

26 Claims, 15 Drawing Sheets

U.S. PATENT DOCUMENTS

| | | | |
|---|---|---|---|
| 6,920,480 | B2 | 7/2005 | Mitchell et al. |
| 6,944,662 | B2 | 9/2005 | Devine et al. |
| 6,952,772 | B2 | 10/2005 | Deo et al. |
| 6,954,751 | B2 | 10/2005 | Christfort et al. |
| 6,959,436 | B2 | 10/2005 | Peng |
| 6,968,181 | B2 | 11/2005 | Ishidoshiro |
| 7,055,042 | B1 | 5/2006 | Gough et al. |
| 7,127,467 | B2 | 10/2006 | Yalamanchi et al. |
| 7,177,859 | B2 | 2/2007 | Pather et al. |
| 7,181,489 | B2 | 2/2007 | Lection et al. |
| 7,266,826 | B2 | 9/2007 | Katiyar et al. |
| 7,360,202 | B1 | 4/2008 | Seshadri et al. |
| 7,444,344 | B2 | 10/2008 | Galindo-Legaria et al. |
| 7,467,389 | B2 | 12/2008 | Mukkamala et al. |
| 7,487,186 | B2 | 2/2009 | Shimshoni |
| 7,509,304 | B1 | 3/2009 | Pather et al. |
| 7,739,232 | B2 | 6/2010 | Ireland |
| 7,752,165 | B2 | 7/2010 | Ireland et al. |
| 2002/0056011 | A1* | 5/2002 | Nardone et al. ............ 709/248 |
| 2002/0065946 | A1 | 5/2002 | Narayan |
| 2002/0095491 | A1 | 7/2002 | Edmonds et al. |
| 2002/0099595 | A1* | 7/2002 | Kelly et al. .................. 705/10 |
| 2002/0116405 | A1 | 8/2002 | Bodnar et al. |
| 2002/0133508 | A1 | 9/2002 | LaRue et al. |
| 2003/0046433 | A1 | 3/2003 | Luzzatti et al. |
| 2003/0061365 | A1 | 3/2003 | White et al. |
| 2003/0069922 | A1 | 4/2003 | Arunachalam |
| 2003/0131051 | A1 | 7/2003 | Lection et al. |
| 2003/0131073 | A1 | 7/2003 | Lucovsky et al. |
| 2003/0137536 | A1 | 7/2003 | Hugh |
| 2003/0148773 | A1 | 8/2003 | Spriestersbach et al. |
| 2003/0187984 | A1 | 10/2003 | Banavar et al. |
| 2003/0212670 | A1 | 11/2003 | Yalamanchi et al. |
| 2004/0002972 | A1 | 1/2004 | Pather et al. |
| 2004/0002988 | A1 | 1/2004 | Seshadri et al. |
| 2004/0064502 | A1* | 4/2004 | Yellepeddy et al. .......... 709/203 |
| 2004/0098754 | A1 | 5/2004 | Vella et al. |
| 2004/0109436 | A1 | 6/2004 | Vargas et al. |
| 2004/0122907 | A1 | 6/2004 | Chou et al. |
| 2004/0128327 | A1 | 7/2004 | Shi et al. |
| 2004/0152450 | A1 | 8/2004 | Kouznetsov et al. |
| 2004/0158577 | A1 | 8/2004 | Chu et al. |
| 2004/0193608 | A1 | 9/2004 | Gollapudi et al. |
| 2004/0255164 | A1 | 12/2004 | Wesemann |
| 2005/0144293 | A1 | 6/2005 | Limont et al. |
| 2005/0160434 | A1 | 7/2005 | Tan et al. |
| 2005/0169213 | A1 | 8/2005 | Scian et al. |
| 2005/0182773 | A1 | 8/2005 | Feinsmith |
| 2005/0216639 | A1 | 9/2005 | Sparer et al. |
| 2005/0232263 | A1 | 10/2005 | Sagara |
| 2006/0026168 | A1 | 2/2006 | Bosworth et al. |
| 2006/0047742 | A1 | 3/2006 | O'Neill et al. |
| 2006/0062356 | A1 | 3/2006 | Vendrow et al. |
| 2007/0112511 | A1 | 5/2007 | Burfeind et al. |
| 2007/0156656 | A1 | 7/2007 | Pather et al. |
| 2007/0190978 | A1 | 8/2007 | White et al. |
| 2008/0189439 | A1 | 8/2008 | Chitre et al. |
| 2009/0036102 | A1 | 2/2009 | Ho |

OTHER PUBLICATIONS

Search Report and Written Opinion for International Application No. PCT/US08/08117 mailed Oct. 29, 2008, 9 pages.

Bray, T. et al. (eds.), *Extensible Markup Language (XML) 1.0 (Second Edition)*, W3C Recommendation, 59 pages (Oct. 6, 2000).

Christensen, E. et al., *Web Services Description Language (WSDL) 1.1*, W3C Note, 31 pages (Mar. 15, 2001).

Eddon, G., "COM+: The Evolution of Component Services," *Computer*, IEEE Computer Society, pp. 104-106 (Jul. 1999).

Ellis, J. and Ho, L., *JDBC 3.0™ Specification Final Release*, Chapters 1-5, pp. v-35, Sun Microsystems, Inc., Mountain View, CA (Oct. 2001).

Fielding, R. et al., *RFC2616: Hypertext Transfer Protocol—HTTP/1.1*, Network Working Group, 176 pages (Jun. 1999).

Gosling, J. and McGilton, H., *The Java™ Language Environment: A White Paper*, Sun Microsystems, pp. i-95 (May 1996).

Gudgin, M. et al. (eds.), *SOAP Version 1.2 Part 1: Messaging Framework*, W3C Recommendation, 52 pages (Jun. 24, 2003).

Gudgin, M. et al. (eds.), *SOAP Version 1.2 Part 2: Adjuncts*, W3C Recommendation, 25 pages (Jun. 24, 2003).

Helal, A. et al., *Replication Techniques in Distributed Systems*, Boston, MA: Kluwer Academic Publishers, ISBN No. 9780306477966, pp. 73-94 (2002).

Leff, A. and Rayfield, J., "Programming Model Alternatives for Disconnected Business Applications," *IEEE Internet Computing*, IEEE Computer Society, pp. 50-57 (May-Jun. 2006).

Search Report and Written Opinion, dated Sep. 25, 2008, for PCT Application No. PCT/US08/07175, 10 pages.

Search Report and Written Opinion, dated Aug. 28, 2008, for PCT Application No. PCT/US08/07757, 10 pages.

Search Report and Written Opinion, dated Nov. 4, 2008, for PCT Patent Application No. PCT/US2008/009130, 10 pages.

Shannon, B., *Java™ 2 Platform Enterprise Edition Specification, v1.4 Final Release*, Sun Microsystems, Inc., Mountain View, CA, pp. i-232 (Nov. 24, 2003).

Socolofsky, T. and Kale, C., *RFC1180: A TCP/IP Tutorial*, Spider Systems Limited, 28 pages (Jan. 1991).

Srinivasan, R., *RFC1831: RPC: Remote Procedure Call Protocol Specification Version 2*, Sun Microsystems, 18 pages (Aug. 1995).

Extended European Search Report directed to related European Patent Application No. 08794396.5-2201, mailed Jul. 29, 2010, from the European Patent Office; 8 pages.

The First Office Action directed to related Chinese Patent Application No. 200880105755.0, mailed Jun. 22, 2011, from the State Intellectual Property Office of the People's Republic of China; 4 pages.

English-Language Translation of the First Office Action directed to related Chinese Patent Application No. 200880105755.0, mailed Jun. 22, 2011, from the State Intellectual Property Office of the People's Republic of China; 8 pages.

The Second Office Action directed to related Chinese Patent Application No. 200880105755.0, mailed Dec. 8, 2011, from the State Intellectual Property Office of the People's Republic of China; 4 pages.

English-Language Translation of the Second Office Action directed to related Chinese Patent Application No. 200880105755.0, mailed Dec. 8, 2011, from the State Intellectual Property Office of the People's Republic of China; 7 pages.

The Mar. 13, 2012 communication from the European Patent Office in the corresponding European Patent Application No. EP 08 794 396.5, from the European Patent Office, Munich, Germany; 8 pages.

Höpfner H; Türker C; König-Ries B: "Mobile Datenbanken und Informationssysteme—Konzepte und Techniken,"2005, Dpunkt. Verlag GmbH, Heidelberg, DE.

* cited by examiner

UNWIRED ENTERPRISE PLATFORM

CROSS-REFERENCE TO RELATED APPLICATIONS

The present application is related to the following applications, all of which are herein incorporated by reference in their entireties:

U.S. patent application titled "System and Methodology for Extending Enterprise Messaging Systems to Mobile Devices," Ser. No. 10/906,065, filed Feb. 1, 2005;

U.S. patent application titled "Persistent Query System for Automatic On-Demand Data Subscriptions from Mobile Devices," Ser. No. 11/882,447, filed Aug. 1, 2007, now U.S. Pat. No. 7,752,165, issued Jul. 6, 2010;

U.S. patent application titled "Programming System for Occasionally-Connected Mobile Business Applications," Ser. No. 11/882,448, filed Aug. 1, 2007, now U.S. Pat. No. 7,739,232, issued Jun. 15, 2010;

U.S. patent application titled "System, Method, and Computer Program Product for Context-Based Data Pre-Fetching and Notification for Mobile Applications," Ser. No. 60/935,182, filed Jul. 30, 2007; and U.S. patent application titled "System and Methodology Providing Service Invocation for Occasionally Connected Computing Devices," Ser. No. 10/904,702, filed Nov. 23, 2004, now U.S. Pat. No. 7,467,389, issued Dec. 16, 2008.

BACKGROUND OF THE INVENTION

1. Field of the Invention

The present invention is generally related to mobility, and more particularly related to incorporating mobility as an intrinsic component of an enterprise.

2. Background Art

In the way that mobile devices have changed consumer lifestyle, mobility is also transforming the enterprise. This space lies at the intersection of enterprise software, networks, and mobile devices. Although relatively new, this space is a rapidly growing business segment.

Not only is mobility becoming increasingly important to the enterprise, it represents a huge opportunity as enterprises unwire. The total worldwide opportunity for mobility—taking into account the services, the infrastructure, the handsets and the glue that holds it together—is potentially $340 billion by 2008.

The various sub-segments of this market are growing at a compound annual growth rate ranging from 8 to 60 percent. The Gartner Group, a leading information technology research and advisory company, has said: "Mobile and wireless technologies will proliferate and mature in the next few years, bringing the Internet and new consumer and business applications to ever more places and devices. These technologies must be at the strategic heart of every organization's IT plans."

To date, mobility implementations have started at the edge, with mobile devices, and have attempted to work back into the core of the enterprise architecture.

There are many flaws with this approach. For example, using this approach, it is difficult, if not impossible, to ensure consistency of the total information technology architecture. As a result, it is difficult to ensure the integrity of the data delivered to the point of action.

This approach also does not afford a global view of the enterprise, or incorporate mobility as an intrinsic extension of the enterprise infrastructure. As a result, mobile interactions for the enterprise tend to be siloed and disjointed from the enterprise's information network.

Accordingly, what is needed is an improved approach for integrating mobility with the enterprise.

BRIEF SUMMARY OF THE INVENTION

The present invention is directed to systems, methods and computer program products for inherently integrating mobility with an enterprise. Briefly stated, according to an embodiment, enterprise data from, for example, business processes and applications is accessed from one or more data sources data sources, wherein such data sources may comprise structured and unstructured data sources. The data is transferred from the enterprise to a plurality of mobile devices over a plurality of diverse networks. In an embodiment, such transfer takes into consideration characteristics of the diverse networks. The enterprise receives data generated by mobile devices while performing enterprise-related operations at the wireless edge. The enterprise responds to environmental changes using the received data. The mobile applications that are built using this data are provisioned on to the devices in a secure way across various devices.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
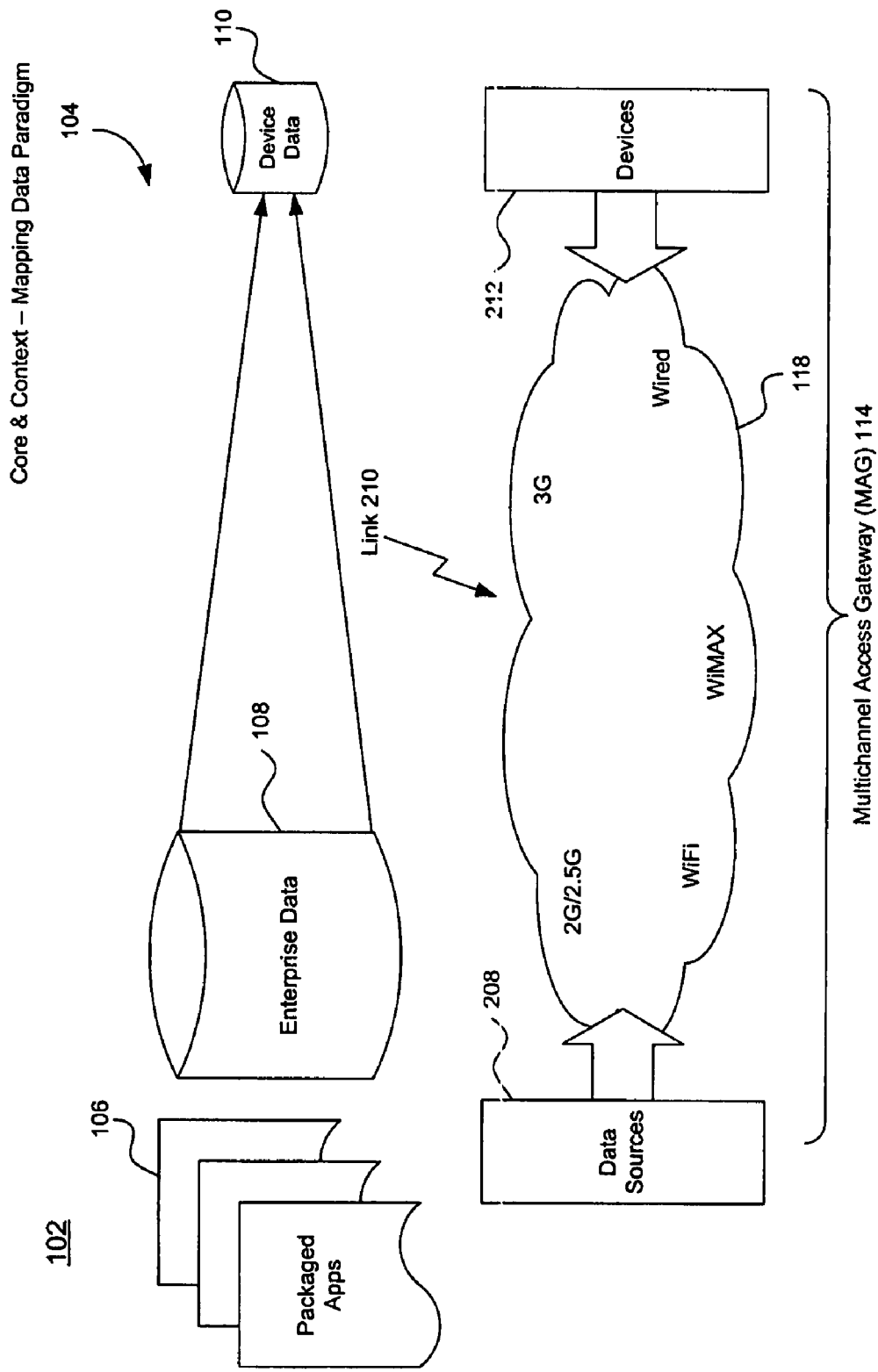
FIG. 1 illustrates a view of an unwired enterprise platform (UEP), according to an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

1. Overview of the Invention

The present invention is directed to embodiments for an unwired enterprise. An unwired enterprise is an enterprise that includes mobility as an intrinsic feature. In this context, mobility refers to mobile devices, including those presently known and those developed in the future. Mobility also refers to mobile users, as well as the operations and processes of the enterprise that involve mobile devices and mobile users.

According to the invention, the unwired enterprise is built from the core of the enterprise outwards to the edge. The edge (also referred to as the wireless edge) refers to enterprise operations and processes performed by mobile users using untethered mobile devices, where such mobile devices are always or occasionally connected to the enterprise via a diverse plurality of wireless communication mediums. According to the invention, the unwired enterprise is built securely from the enterprise applications and business processes to the middleware to the wireless edge.

Figure 2:
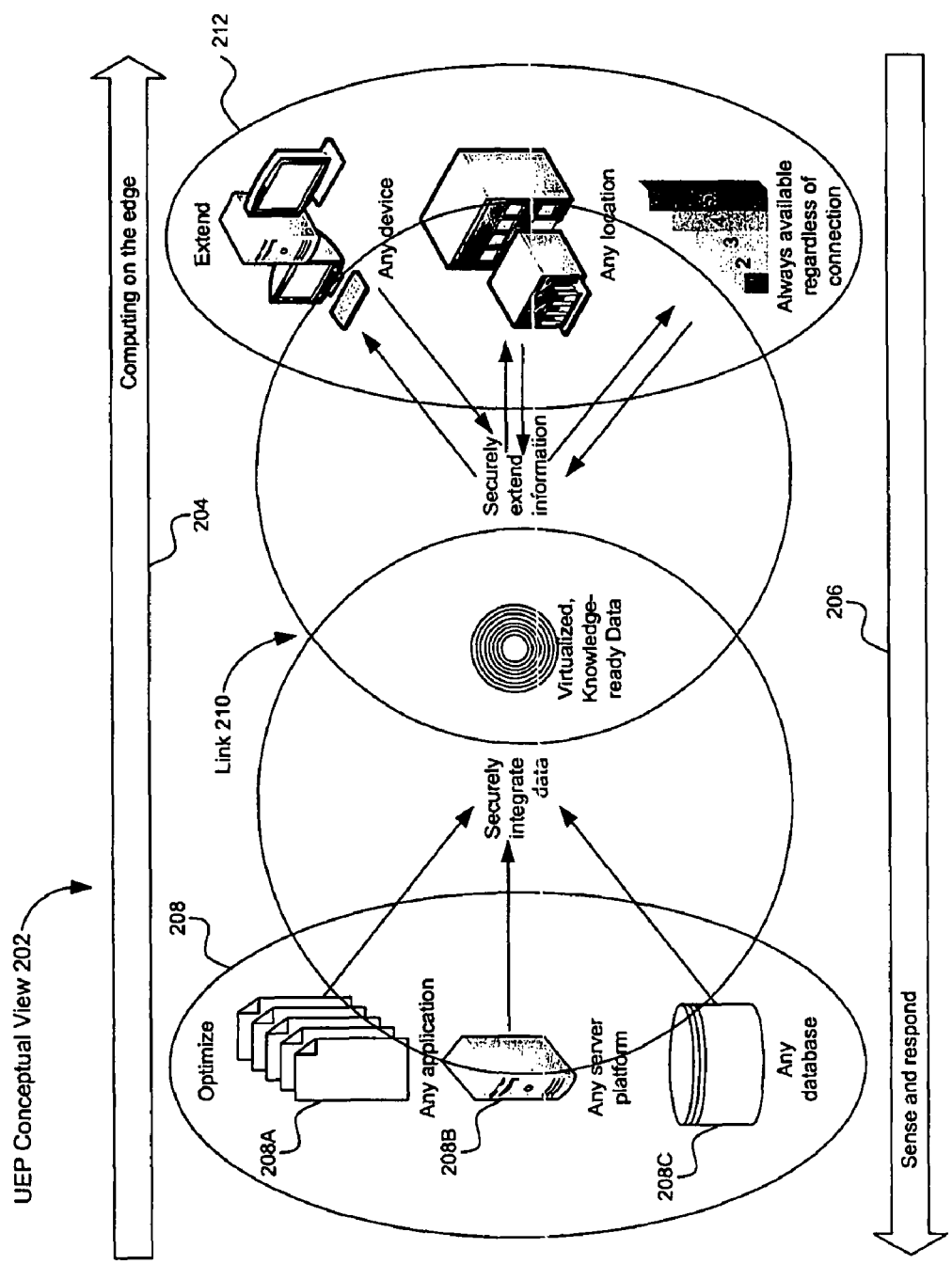
FIG. 2 illustrates a conceptual view of the UEP, according to an embodiment of the invention.

The invention enables an unwired enterprise through use of an unwired enterprise platform (UEP). FIG. 2 illustrates a conceptual view 202 of the UEP. The UEP includes a number of data sources 208, such as but not limited to computer applications 208A, server platforms 208B, and databases 208C. Data is provided from data sources 208 to mobile devices 212 operating on the edge via a link 210 (this is represented by the computing on the edge arrow 204). The UEP ensures that such data is integrated and extended to mobile devices 212 in a secure manner. Mobile devices 212 may be any existing or future mobile device, and may be operating from any location.

Mobile devices 212 perform enterprise-related operations, processes and/or tasks on the wireless edge. Information generated, collected or otherwise obtained by mobile devices 212 is sent back to the enterprise (represented by enterprise data 208) via the link 210. The enterprise uses this information to sense and respond to changes in its business environment (this is represented by the sense and respond arrow 206). Business environment refers to any environment, condition or community relevant to the enterprise, such as the enterprise's customers, competitors, market forces, inventory, etc.

FIG. 1 illustrates another view 102 of the UEP. In an embodiment, the UEP constitutes a multichannel access gateway (MAG) 114. The UEP facilitates connectivity to multiple diverse and disparate wired and wireless networks, including but not limited to WiFi, 2G/2.5G, WiMAX, Wired and 3G. Other wired and wireless mediums will be apparent to persons skilled in the relevant art(s), and fall within the scope of the present invention.

Accordingly, mobile applications operate in a heterogeneous network environment with varying degrees of reliability, bandwidth, latency, connectivity, etc. The user experience can be compromised if a perfect network connection is assumed. According to embodiments of the invention, the UEP takes into consideration the characteristics of the diverse networks 118 when moving to and from mobile devices 212. Features of this aspect of the invention are described below in Sections 7 and 10. Additional features of this aspect of the invention are provided in Sections 8 and 9.

The UEP allows applications to view the wired and wireless worlds as a single world (a single context). By doing so, the UEP hides the complexities of implementations across the multiple diverse networks 118, and across an increasing range of mobile and fixed devices 212.

According to embodiments of the invention, the data 110 resident on any given mobile device 212 includes only a subset of the enterprise data 108 (also referred to herein as the enterprise or consolidated database 108). This is shown as the mapping data paradigm 104 in FIG. 1. There are a number of factors that influence how much data to keep on the device 212, such as:

Even with encryption, it is risky to have enterprise data on a mobile device.

It is difficult, if not impossible, to keep so much data between the enterprise and all clients in sync.

Device capacity may be measured in gigabytes, but enterprise data is in terabytes, petabytes or even exabytes.

Embodiments of the invention include intelligent data fetching and/or synchronization processes to better ensure that pertinent device data 110 is provided to the mobile user on a timely basis. These processes are described in sections below, such as but not limited to in Sections 8 and 10.

Figure 3:
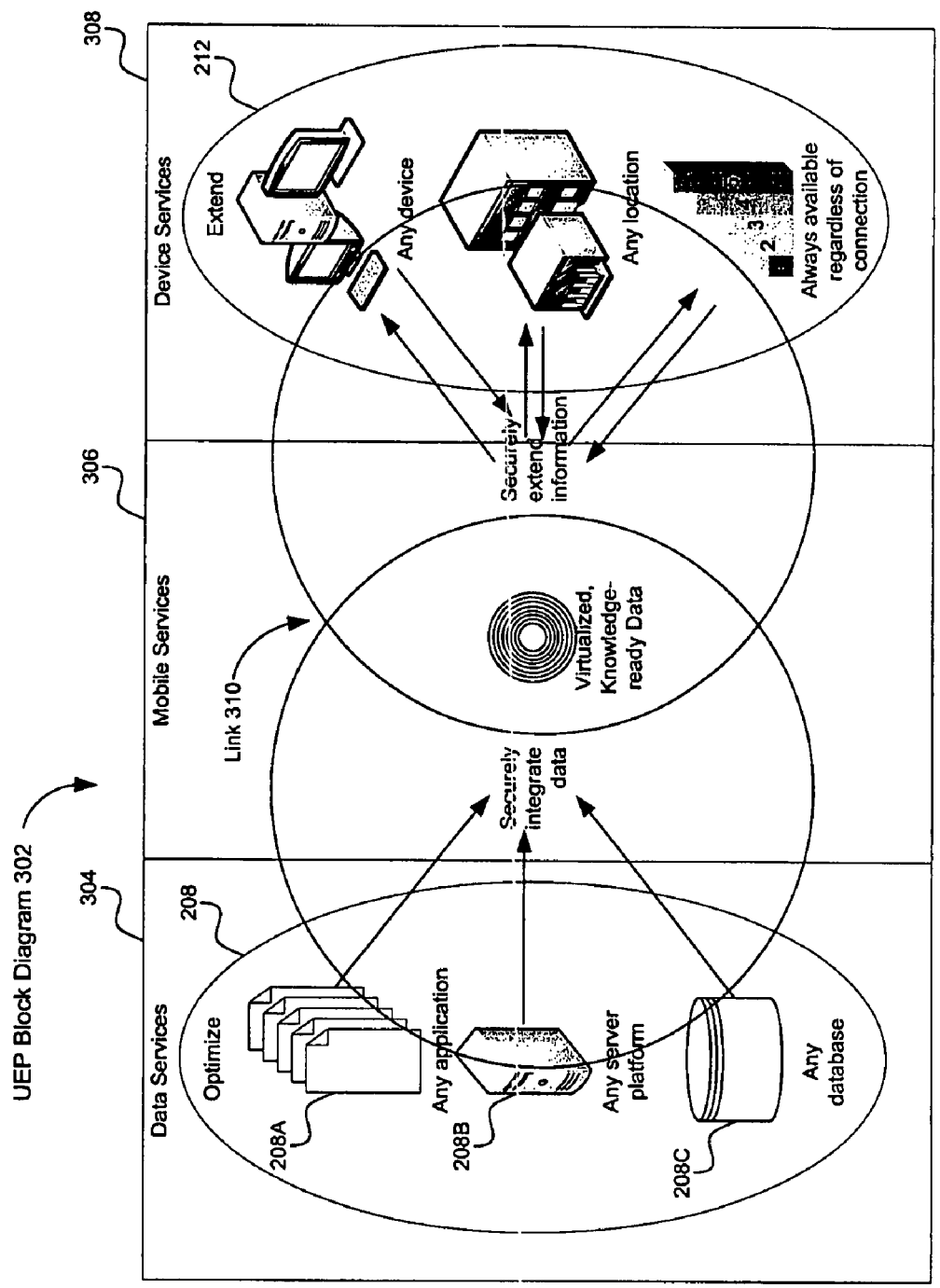
FIG. 3 is a block diagram of the UEP, according to an embodiment of the invention.

FIG. 3 illustrates a block diagram 302 of the UEP. The UEP includes a data services component 304, a mobile services component 306 and a device services component 308.

Figure 4:
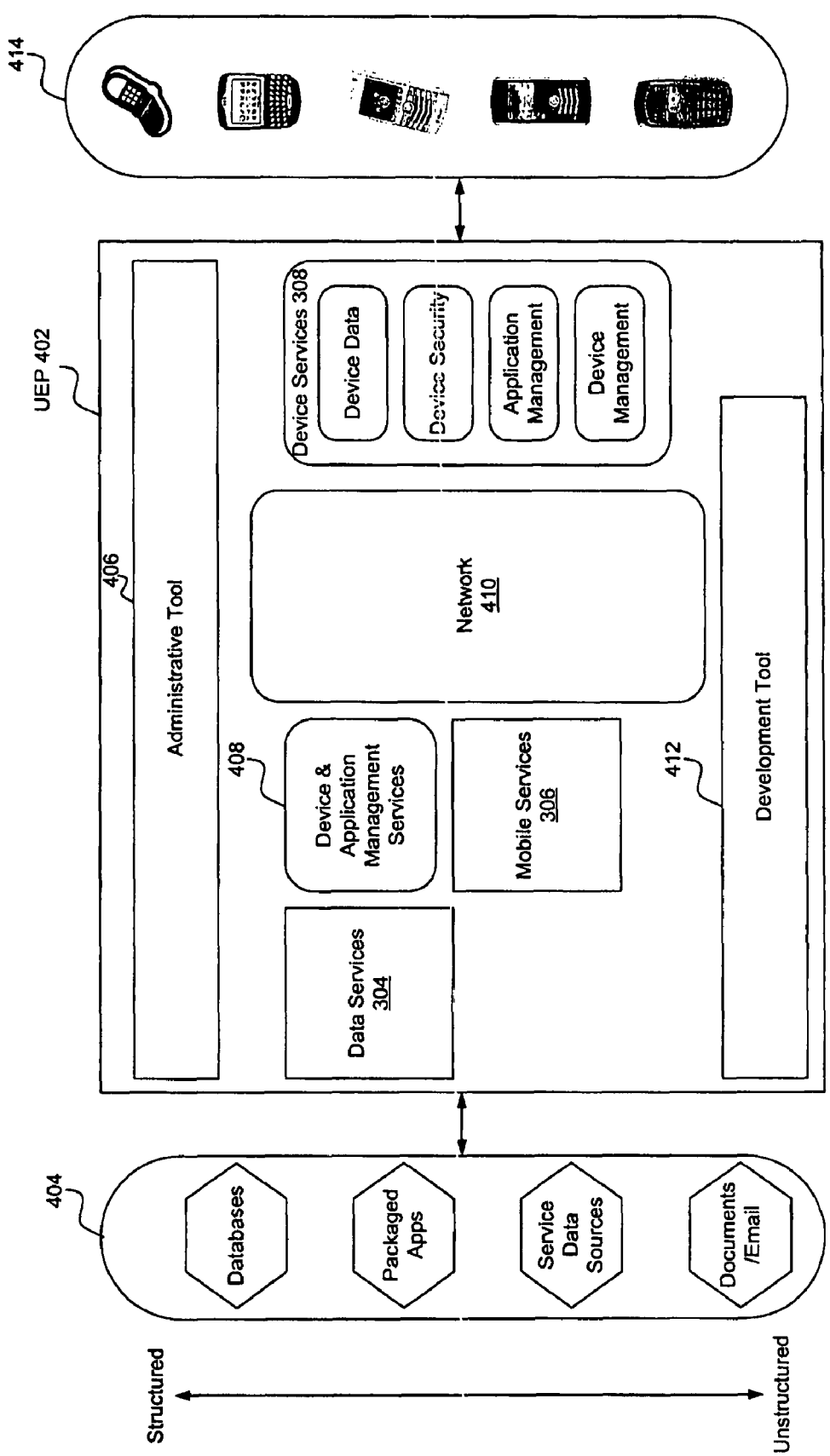
FIG. 4 is a logic block diagram of the UEP, according to an embodiment of the invention.

FIG. 4 illustrates a logic block diagram of an embodiment of the UEP 402. Data services 304 represents the interface with data sources and processes 404 (such data sources 404 may be structured, semi-structured and/or un-structured), and device services 308 represents the interface with devices 414. Mobile services 306 and device & application management services 408 represent middleware between data services 304 and device services 308. UEP 402 also includes an administration tool 406 and a development tool 412, which are used to develop applications for mobile devices 414. These components of the UEP 402 are described further in sections below.

Activities enabled by the UEP 402 include, but are not limited to, those shown in Table 1.

TABLE 1

| Activities Enabled by Unwired Enterprise Platform |
|---|
| Activities That May Be Performed By the Enterprise Developer (may be performed by others): |
| OO modeling of virtualized view or physical data sources<br>Develop business transactions using data exchange or service invocation for synchronization<br>Define virtualized view<br>Provision virtualized view to Data Services<br>Develop business logic components<br>Specify prefetch policy for OO models |

TABLE 1-continued

Activities Enabled by Unwired Enterprise Platform

Figure 9:
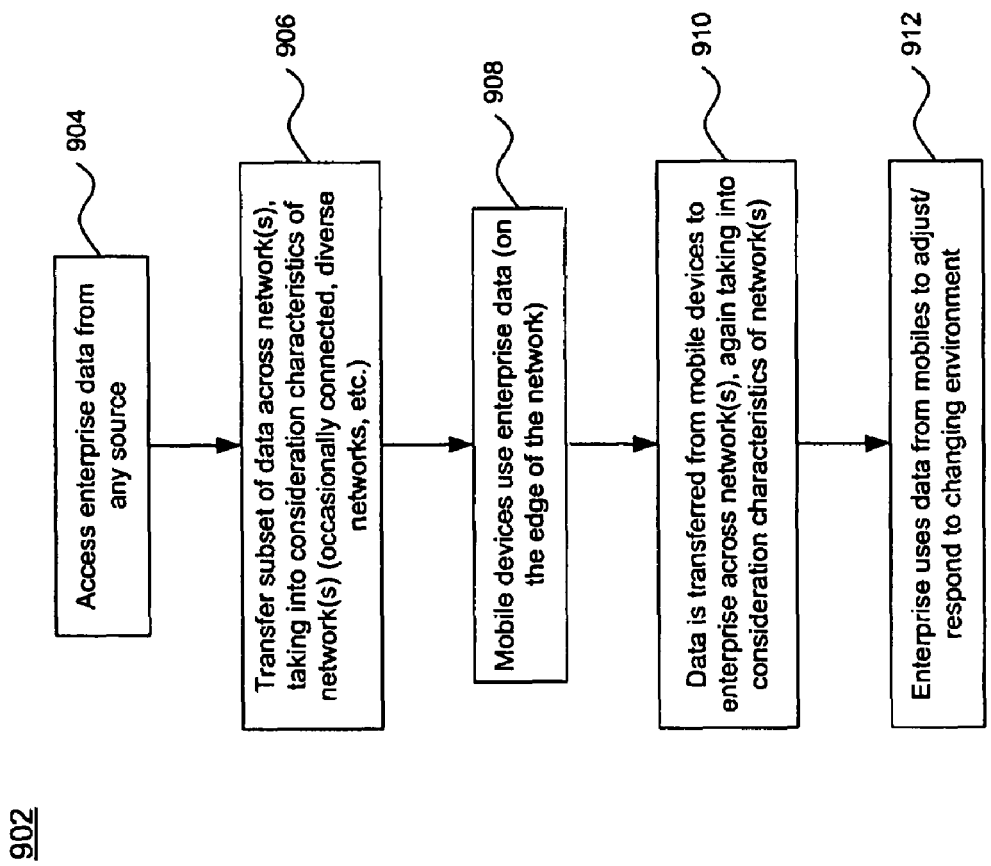
FIG. 9 is a flowchart illustrating an example operational embodiment of the UEP.

Activities That May Be Performed By the Mobile Developer (may be performed by others):

Develop mobile applications using OO models, UE API, device specific API + UI tools
Activities That May Be Performed By the Platform Administrator (may be performed by others):

Provision and manage mobile application
Set up device and platform security policy to support single sign on and end-to-end data security
Configure caching policy in Data Services FIG. 9 illustrates a high level operational flowchart 902 of the UEP 402, according to an embodiment of the invention. In step 904, enterprise data is accessed from any data source, such as data sources 404 shown in FIG. 4, as well as enterprise applications and business processes (and any combination thereof). The operation of step 904 involves data services 304 and mobile services 306.

In step 906, data is transferred over network(s) 410 to devices 414. Such transfer takes into consideration the characteristics of the diverse networks 410. The operation of step 904 involves mobile services 306 and device services 308, and aspects of such operation are described in Sections 7-10.

In step 908, mobile devices 414 perform enterprise-related operations, processes and/or tasks on the wireless edge.

In step 910, information generated, collected or otherwise obtained by mobile devices 212 is sent back to the enterprise via the multiple diverse networks 410. The operation of step 910 involves mobile services 306 and device services 308, and aspects of such operation are described in Sections 7-10.

In step 912, the enterprise uses this information to sense and respond to changes in its business environment.

Advantages of the invention shall now be described with reference to a field force automation example. Other advantages of the invention will be apparent to persons skilled in the relevant art(s) based on the teachings provided herein.

Field force automation is a good market segment for understanding the applicability and value of mobile applications. Consider a utility company as the business domain. With a utility company, there is a high volume of field personnel, continuously visiting customer sites across a wide geographic area, either on a preplanned schedule or responding to incidents generated by customer calls. Typically the bulk of these scheduling and reporting tasks are paper based, resulting in a significant amount of time invested in essential but non-skilled activities. By employing mobile field force automation solutions, the majority of these activities can be automated and optimized, including but not limited to:

Goal-directed visual interfaces on hand-held devices enable personnel to handle more skilled tasks in the same amount of time by utilizing technologies such as GPS and radio/wireless networks to do intelligent allocation of on-demand tasks.

Technologies such as mobile middleware can route tasks generated by customer incidents in real-time to the closest field personnel resulting in optimized usage of resources and a higher level of customer service.

Trip reports captured by combining the original service ticket, task and inventory information captured at the jobsite, and the technician's notes entered through the mobile user interface can be delivered to the enterprise infrastructure for necessary backend processing.

The billing processes are fully engaged as soon as the technician completes the task.

Customer satisfaction can be improved by leveraging mobile technology to provide faster processing of customer incidents and more accurate schedule estimates.

Technicians can be more productive by having a handheld application provide immediate access to part installation instructions and replacement part inventory levels without needing to carry around heavy manuals or make lengthy phone calls to the home office.

Figure 12:
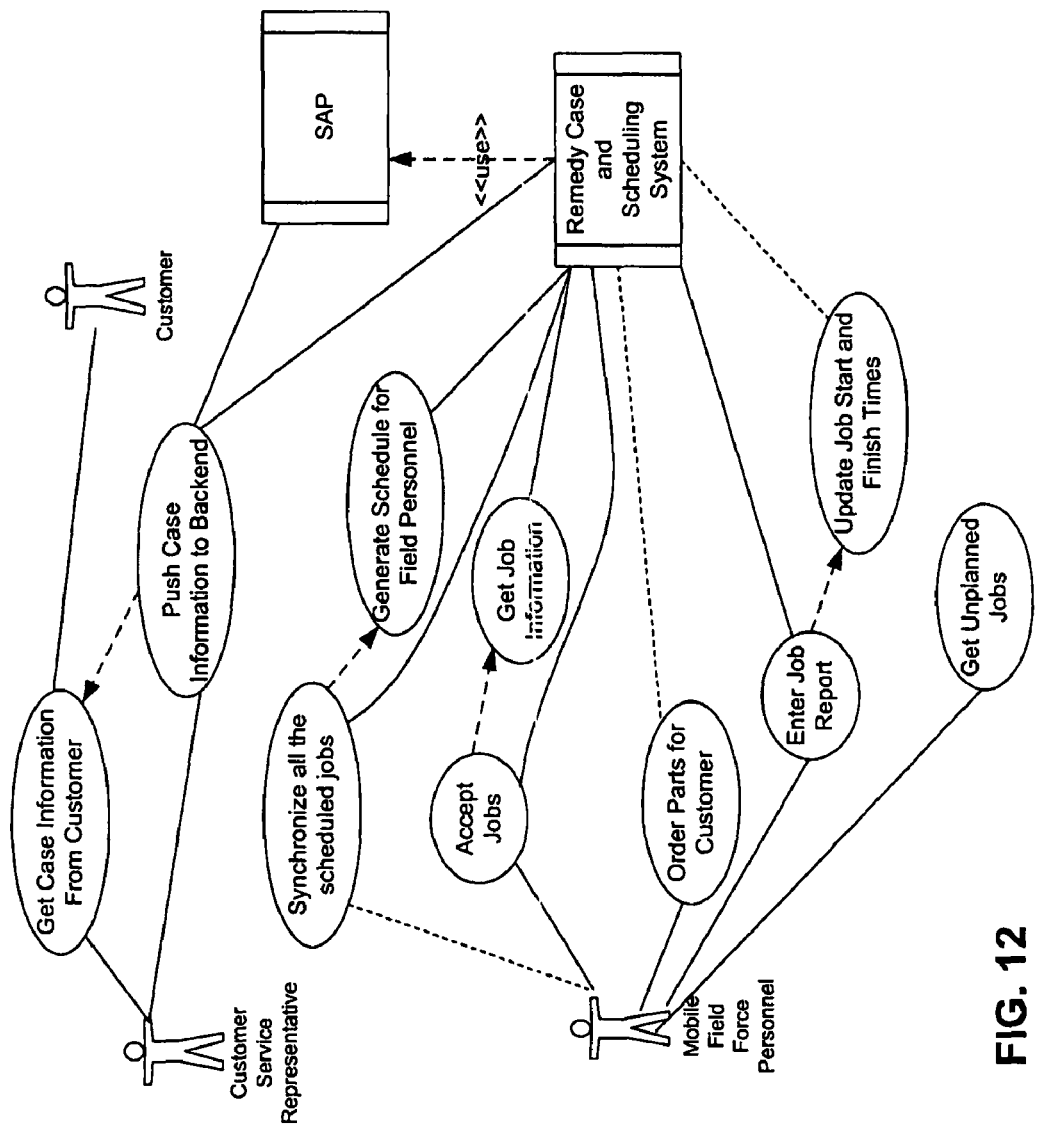
FIG. 12 is a data flow diagram illustrating a use case applicable to the UEP, according to an embodiment of the invention.

See FIG. 12 for an example depiction of these activities.

In summary, mobility enhances personnel productivity, making the utility company more efficient. The invention, including the unwired enterprise platform (UEP) described herein, achieves these advantages.

2. Device Services

Figure 5:
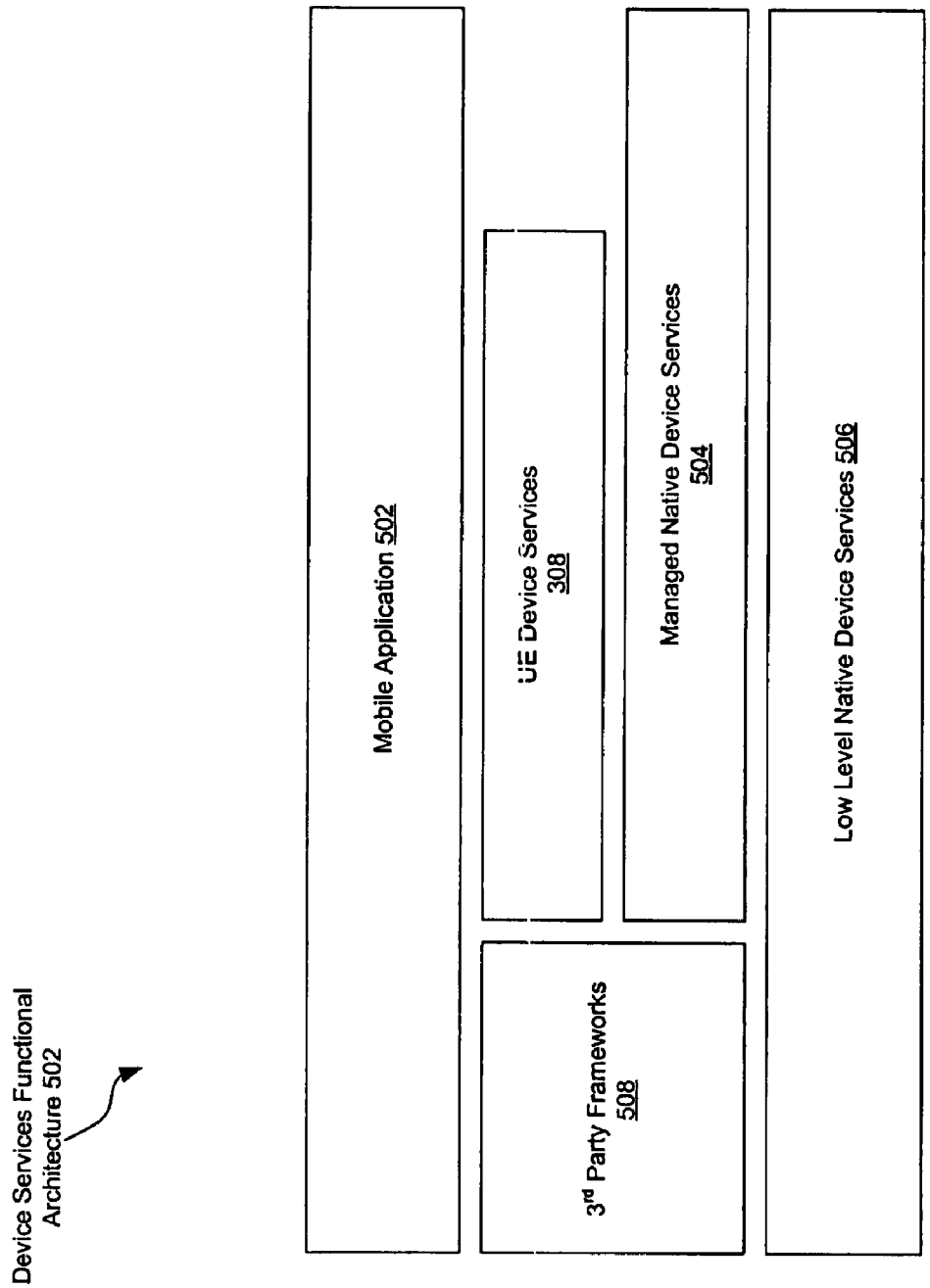
FIG. 5 is a device services functional architecture diagram, according to an embodiment of the invention.

FIG. 5 illustrates a functional architecture 502 of the device services module 308, according to an embodiment of the invention. A mobile application 502 runs on top of and interacts with the device services module 308. In an embodiment, a subset of the mobile device's low level native services 506 are managed by device services 308 (in other embodiments, device services 308 manages all low level native device services 506). This subset is called the managed native device services 504. Mobile application 502 might also interact with frameworks 508 provided by third parties.

In essence, device services 308 is an abstraction layer that provides a common interface to low level native device services 506. This interface (called an application programming interface, or API) is common among all devices 414. Consequently, developers are able to more easily program devices 414 without having to know the intricacies of the low level native device services 506.

Device services 308 run on devices 212. Specifically, in an embodiment, a device 212 has one or more device services agents that communicate with mobile services 306 in the enterprise to provide data synchronization, messaging, device, application management, as well as other functions described herein.

Functions provided and/or performed by device services 308 include, but are not limited to, those listed in Table 2.

TABLE 2

Device Services Features and Functions

Synchronization Agent (See also Sections 7-10):

Policy based movement of data to and from the device
Send presence information to Mobile Server
Network information, GPS data
Listener and dispatcher of server initiated notifications
Code Generation Support Library:

Object API
Persistence access layer including encryption and compression
Business operations queuing
Component Library:

Access to device characteristics and resource information
Mobile Server connection parameters
Notification Service
Register for network change and server notifications, etc.
GPS API
email API
Security Manager:

Device Un/Locking
Encryption service
File protection

TABLE 2-continued

Device Services Features and Functions

Credentials (single sign-on) - across entire UE platform
Device Management Services
Application deployment and maintenance
Kill pill
Persistence API SQL access to embedded relational database
Data encryption, etc

3. Mobile Services

Figure 6:
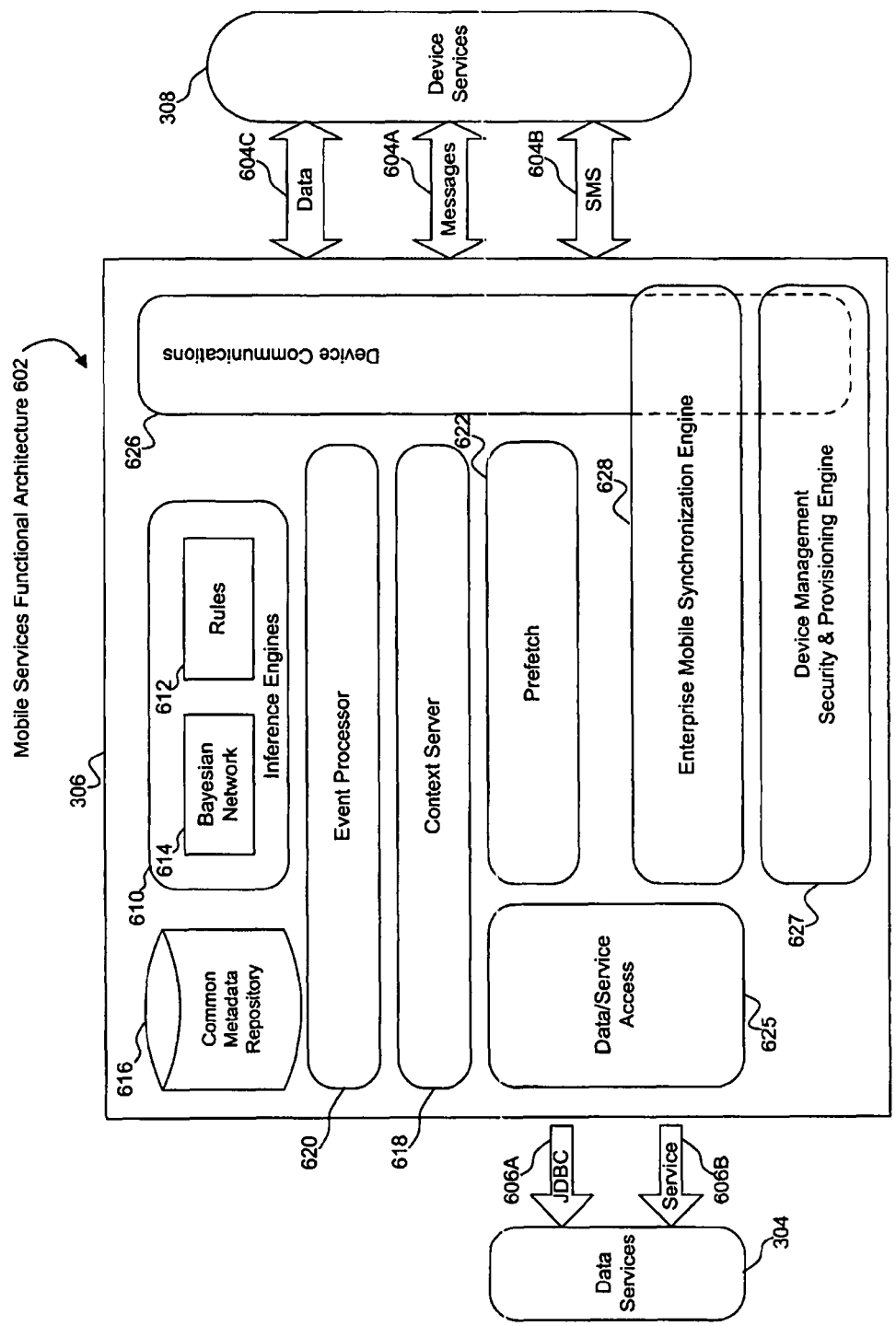
FIG. 6 is a mobile services functional architecture diagram, according to an embodiment of the invention.

FIG. 6 illustrates a functional architecture 602 of the mobile services module 306, according to an embodiment of the invention.

Mobile services 306 (also called mobile middleware services or middleware) represents middleware that "links" mobile applications with the enterprise data and services. It provides runtime support for these mobile applications, and has the ability to invoke web services.

Mobile services 306 supports the operation of mobile applications on devices 212. According to an embodiment of the invention, mobile services 306 operates with, is applicable to, and/or provides advantages when working with:

Occasionally connected environments.
Applications where data is required on mobile devices for uninterrupted operation and good user experience.
When there is a need for higher programming abstraction to hide complexity, enhance productivity and lower expertise required to generate applications.
When the data set is too large or sensitive to be completely resident on the device.
When transactions from mobile application are required to integrate with enterprise data and services.
When there is a need for a higher level of relevancy and timeliness through the use of context and inference.
Applications involving asynchronous interaction patterns through events and messages.

Functions performed by mobile services 306 include, but are not limited to the following.

"Near time" messaging, data synchronization and SMS exchange with client side modules
  Object oriented abstraction over relational data:
  Ease mobile application development using .NET or Java classes
  Client and server side code generation for O/R mapping and persistence
  Upload and download cursor processing leveraging JPA and Java custom base classes
  Supports both data and operations synchronization patterns to adapt to data-centric, process centric or mixed environments
  Object oriented modeling via UML
  Object graph analysis for determination prefetch strategy
  Scalable processing for events received from devices and enterprise.
"Relevancy and Timeliness" via context and inference.
Context awareness offers possibilities for:
  Intelligent prefetch
  Smart alert and event notifications
  Capture user provided metadata and intelligence to widen the moat as well as protection against "good enough" and low cost alternatives Mobile services 306 communicates with device services 308 (i.e., devices 212) using any format, protocol or means, including but not limited to messages 604A, SMS 604B, and data 604C. A device communications module 626 is an abstraction layer that provides to devices 414 a common interface for interacting with the enterprise.

Mobile services 306 interacts with data services 304 using any format, protocol or means, including but not limited to JDBC 606A and services 606B. Data/service access 625 is an abstraction layer that provides to the enterprise (and its data sources 404) a common interface for interacting with the mobile services component 306.

Mobile services 306 includes inference engine 610 (comprising rules 612 and a Bayesian network 614). Mobile services 306 also includes a metadata repository 616, context server 618, an event processor 620, synchronization engine 628, prefetch module 622, and a device management security & provisioning engine 627.

Features and functions of the synchronization service 628 are described, for example, in Section 7

Features and functions of the prefetch service 622 are described, for example, in Sections 8-10.

4. Data Services

Figure 7:
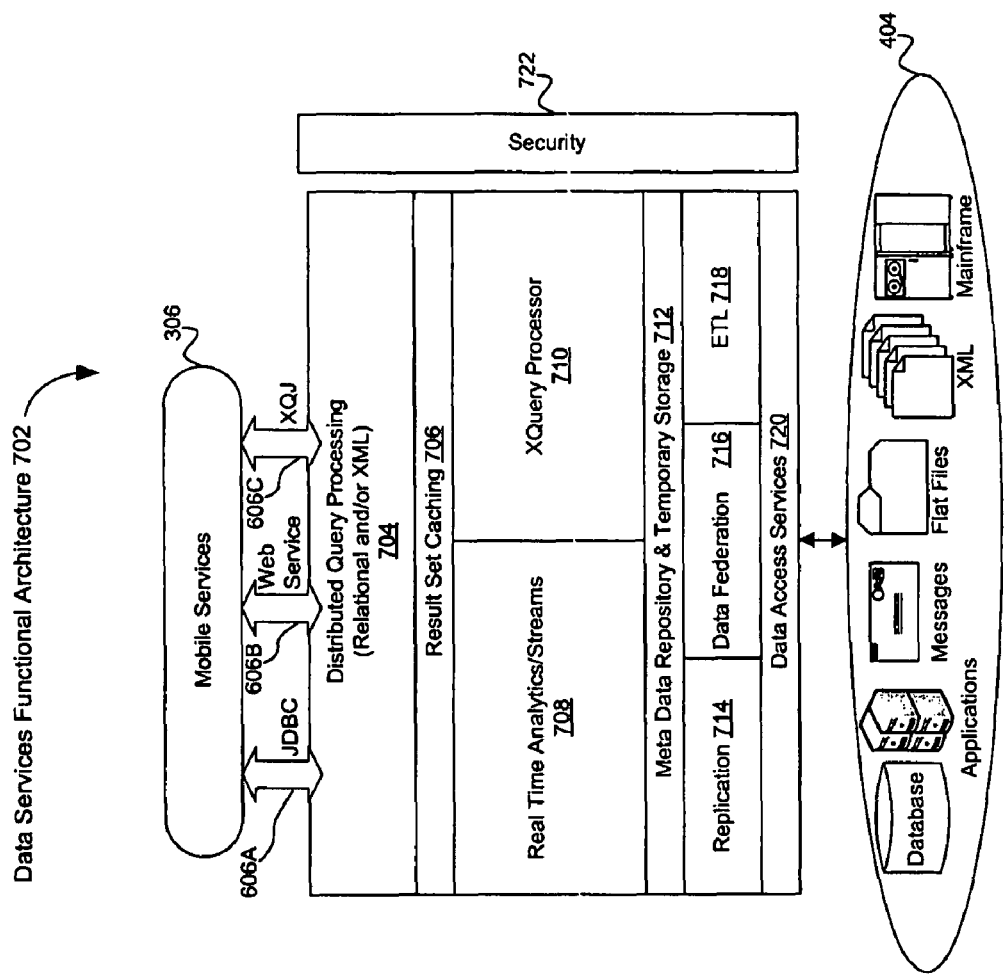
FIG. 7 is a data services functional architecture diagram, according to an embodiment of the invention.

FIG. 7 is a functional architecture 702 of the data services module 304.

Data services 304 is an abstraction layer enabling common access to back end data sources 404. Data services 304 performs queries over data sources 404, and transforms and caches data retrieved from data sources 404.

Data services 304 is a functional stack comprising a distributed query processing layer 704, a result set caching layer 706, a layer comprising real time analytics/streams 708 and a XQuery processor 710, a meta data repository & temporary storage layer 712, a layer comprising replication 714, data federation 716 and ETL 718 and a data access services layer 720.

Functions provided and/or performed by data services 304 include, but are not limited to, those listed in Table 3.

TABLE 3

Data Services Features and Functions

Provides a homogeneous model for disparate data sources (relational DB, mainframes, flat files)

Presents both relational and XML view of data
Provides a standard interface to data models using JDBC and XQJ
JDBC 4.0 includes XQJ
Allows Web service access
Provides a way to connect to a standard message bus for financial and telecommunication markets Standard adapters to TIBCO, JMS, MQ, Reuters
Provides multi-node distributed caching of data (relational and XML) out of the enterprise to reduce access to data sources. In an embodiment this is performed by the result set caching layer 706 shown in FIG. 7.

Cache synchronized through asynchronous or synchronous replication
Data is 100% transactional
Provides both scale-out and scale-up
Provides a way to search streaming data by using continuous querying facility Allows rapid response to customer dynamics
Capability to analyze complex business conditions
Wide use in both financial and telecommunication markets
Provides the same level of security as any enterprise class backend database

TABLE 3-continued

Data Services Features and Functions

Provides full database compatible access privilege support
Strong encryption algorithm as well as provision for hooking up third party encryption/decryption algorithms
Provides distributed transaction across multiple data sources using transaction coordinator Applicable for data sources that support a standard transaction coordination model
Strong Distributed Query Processing
Allows intelligent push down of work units to disparate data sources to reduce network traffic and maximize resource usage

5. Development Tool

Figure 8:
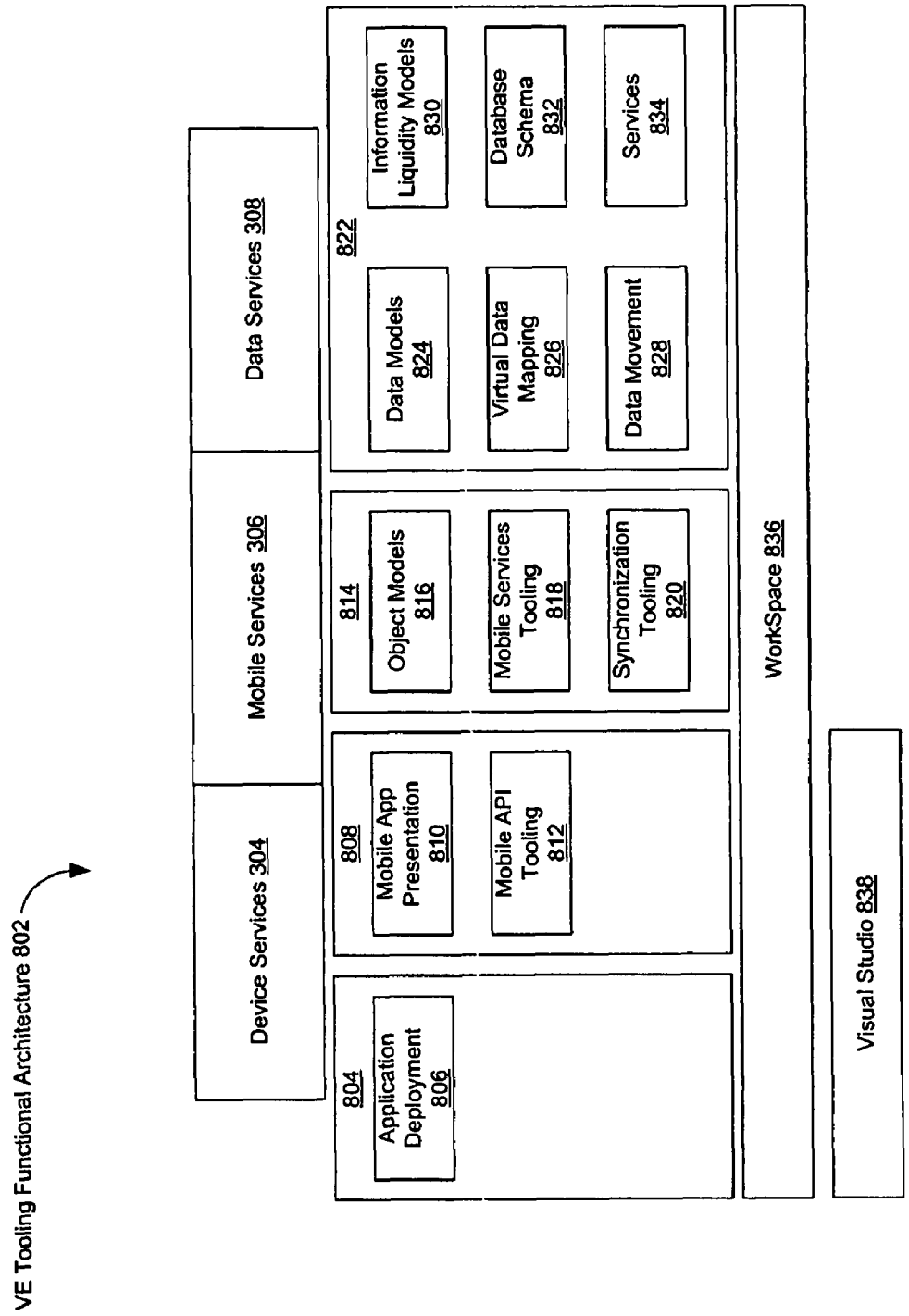
FIG. 8 is a development tool functional architecture diagram, according to an embodiment of the invention.

FIG. 8 is a functional architecture 802 of the development tool 412, which is used to develop device applications. Modules 804 and 808 (and their sub-modules) generally interface and correspond to device services 304. Module 814 (and its sub-modules) generally interface and correspond to mobile services 306. Module 822 (and its sub-modules) generally interface and correspond to data services 308. A process for generating applications is described in the following section.

6. Run Time Block Diagram

Figure 10:
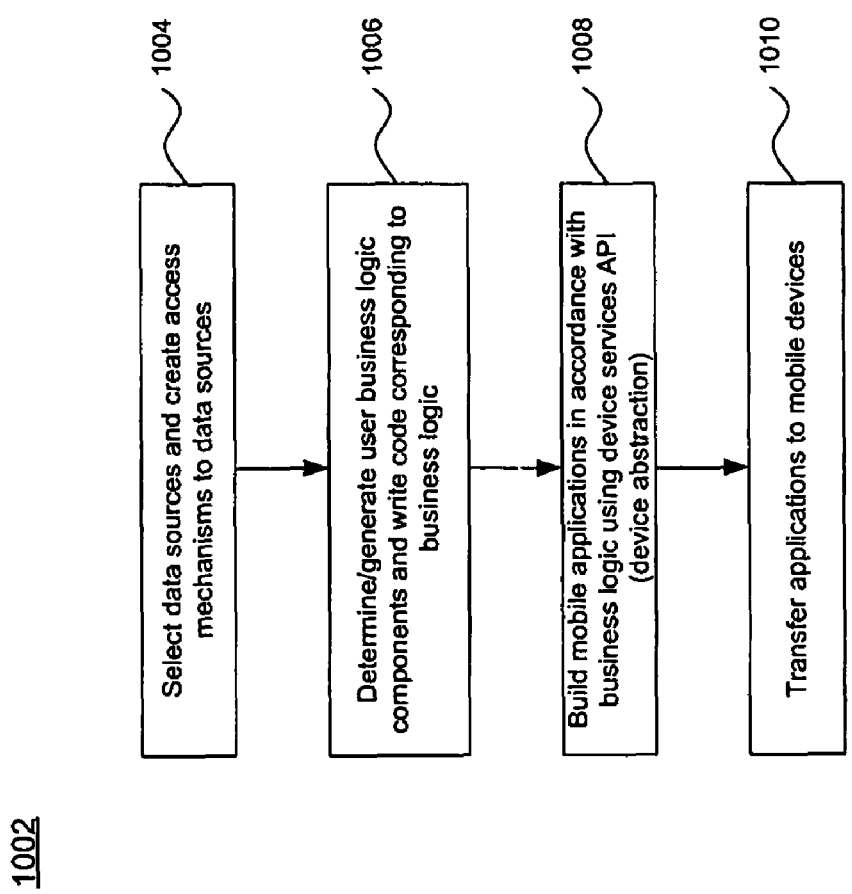
FIG. 10 is a flowchart illustrating a method for generating device applications for use with the UEP, according to an embodiment of the invention.

FIG. 10 is a process for generating and transferring applications to mobile devices, according to an embodiment of the invention. In an embodiment, the development tool 412 described above is used to generate such device applications.

In step 1004, data sources 404 are selected. These are the data sources 404 that will be accessed by the application when it is executing on the device. Also, mechanisms to access such selected data sources are created using the data services API (see 1104 in FIG. 11).

In step 1006, user business logic components are determined. Such business logic components correspond to the functions and logic that the application is to perform. Code is written corresponding to the user business logic components (see 1106 in FIG. 11).

In step 1008, mobile device application(s) (see 1122 in FIG. 11) are built in accordance with the user business logic components using the device services API.

Figure 11:
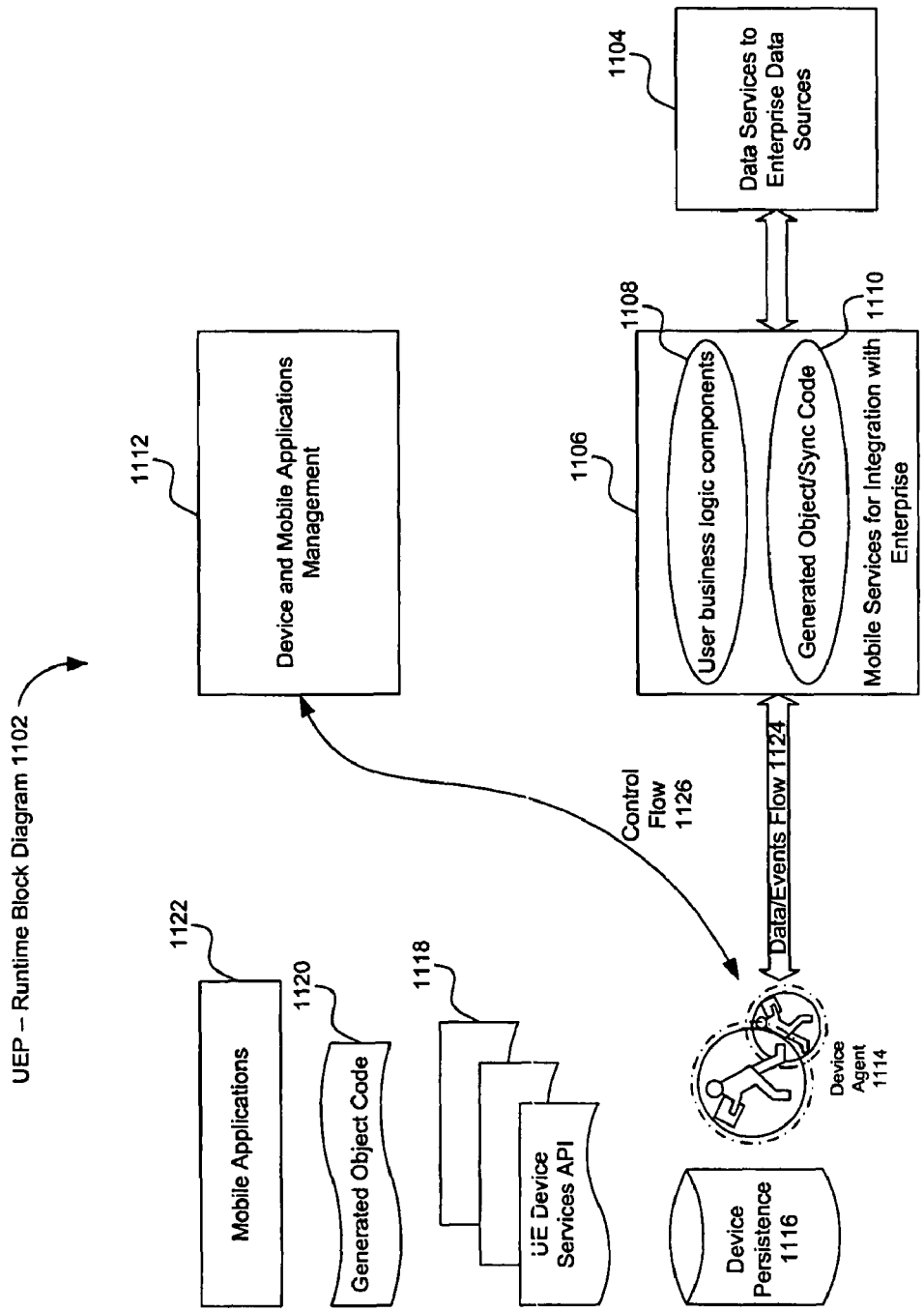
FIG. 11 is a data flow diagram used to illustrate the method of FIG. 10, according to an embodiment of the invention.

In step 1010, the application(s) 1122 are transferred to mobile device(s) (see 1112 in FIG. 11).

Figure 15:
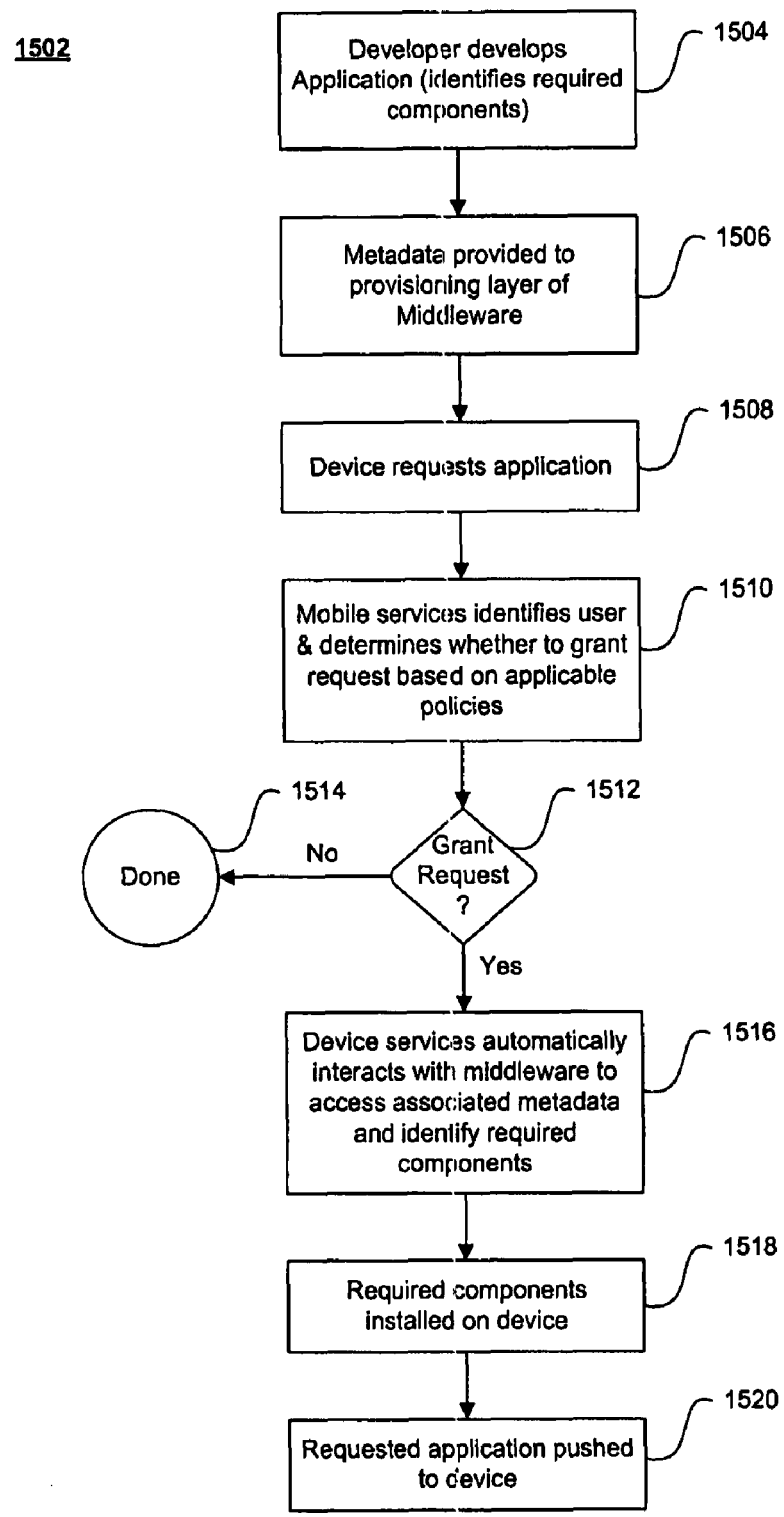
FIG. 15 illustrates a process for developing and provisioning applications to mobile devices, in accordance with an embodiment of the present invention.

FIG. 15 illustrates process 1502 representing additional features related to developing and provisioning applications to devices 212, according to an embodiment of the invention.

In step 1504, a developer develops an application (according to, for example, the process of FIG. 10 described above). In the course of developing the application, the developer identifies software components that are required on a device 212 to properly execute the application. For example, the developer may identify an operating system, library, plug-in, etc., that are required to be installed on a device 212 so that the application will properly execute on the device 212.

The listing or identity of such required components is considered to be metadata associated with the application developed in step 1504. In 1506, such metadata is provided to mobile services 602 and stored in the metadata repository 616. In an embodiment, the developer provides the metadata to an administrator who stores the metadata in the metadata repository 616.

In step 1508, at some later time, a device 212 that is operating on the wireless edge requests that the application be installed.

In step 1510, mobile services 306 determines whether to grant this request to install the application on the device 212. In an embodiment, this step 1510 is performed by the device management security & provisioning engine 627. In an embodiment, the device management security & provisioning engine 627 determines whether to grant this request in accordance with policies applicable to the requested application. For example, a policy may specify that the application can only be used by certain personnel. In this case, the device management security & provisioning engine 627 would determine whether the user associated with the requesting device 212 is one of those authorized persons. Another policy may specify that the application can only be used in certain geographical locations, or during certain times. In those cases, the device management security & provisioning engine 627 would determine if the device 212 was located in the approved geographical locations, or whether the current time was one of the approved times.

If the device management security & provisioning engine 627 determines, in accordance with applicable policies, that the request of step 1508 should be granted (see step 1512), then in step 1516 any software components required for proper operation of the application are identified. In an embodiment, device services 308 agents operating on the requesting device 212 automatically interact with mobile services 306 to access the applicable metadata in the metadata repository 616, and determine any software components needed by the requested application.

In step 1518, the required software components identified in step 1516 are installed on the device 212. Depending on the nature of the required software components, step 1518 may be automatically performed (i.e., the required software components are automatically pushed to the device 212) or manually (i.e., the user of the device 212 is required to manually install the required software components). Some required software components may be installed automatically and others manually.

In step 1520, the device management security & provisioning engine 627 automatically pushes the requested application to the device 212.

Thus, in accordance with the operation shown in FIG. 15, the invention provisions applications to mobile devices in such a way that application, device and enterprise security are integrated. This is achieved in part by integrating meta-data between development and deployment layers for platform requirements.

7. Background Policy-Based Data Synchronization

In a mobile occasionally connected environment, where connectivity to the enterprise is not always available, applications require enterprise data to be persistent locally on the device in order to run. To do so, a method for tracking changes, both on the remote and in the enterprise, and synchronizing them is required. Conventional techniques for synchronizing remote data sources with enterprise data sources exist today. These techniques require that the application be responsible for initiating synchronization, detecting synchronization failures due to network interruptions and handling these failures in an appropriate manner.

The invention includes a system, method and computer program product for background policy-based data synchronization that eliminates the need for the mobile application (and therefore the mobile application developer) to deal with data synchronization. This technique automatically performs the task of synchronizing data between the mobile data source and the enterprise data source on behalf of the mobile application and deals with synchronization failures in a way that is transparent to the application.

According to an embodiment, background policy-based data synchronization has the following characteristics:

The application, and the operations it performs on data, is independent of data synchronization. Data synchronization is performed in the background by a separate process that runs independently of the application. This allows data synchronization to occur even if the application is not running.

Data synchronization is policy-based. A policy describes when data synchronization occurs and the data that is included in the data synchronization. Pre-defined polices are available that will satisfy most mobile application requirements for data synchronization. More sophisticated applications will have the ability to define their own policy by creating a set of rules.

Network connectivity is monitored so that data synchronization can occur based on network availability.

Server-side changes will be promptly delivered to the mobile device. This requires that a mobile device be notified of server-side changes and initiate data synchronization based on the policy being used.

According to an embodiment of the invention, a policy is used to describe how background synchronization takes place. The policy specifies when data synchronization occurs and the data involved in the data synchronization. A set of pre-defined policies are available. These include, but are not limited to, the following: scheduled, automatic, on-demand and custom.

The scheduled policy is one that causes data synchronization to occur at a specified interval. When the specified time interval has elapsed, synchronization will occur if the network is available and connectivity with the server can be established. If the network is not available, an attempt will be made again at the next time interval.

The automatic policy is one that, using heuristics, attempts to keep the mobile and enterprise data sources as up-to-date as possible. One possible heuristic is to synchronize after a specified number of transactions have been applied to the local data source (a default of one could be used if no number is specified). After the specified number of transactions has occurred, synchronization will occur if the network is available and connectivity with the server can be established. If the network is not available, an attempt will be made again once the network becomes available.

The on-demand policy is one where data synchronization is left in the hands of the mobile application. When this policy is used, it is the responsibility of the application to initiate synchronization and deal with network connectivity issues. An application will initiate synchronization using an API that will be provided as part of the synchronization service.

The custom policy allows applications to define their own synchronization policy. This is done by specifying a set of rules. A rule includes two parts: a schedule and a condition. The schedule defines when data synchronization is to occur. The condition defines the conditions that must be satisfied in order for data synchronization to take place. The condition can be based on the characteristics of the network in current use. The condition can also specify constraints on the data and thereby defining the data to be included in the data synchronization.

The module that is responsible for performing background policy-based synchronization is called the Synchronization Agent. The Agent runs independent of the mobile application. In an embodiment, the Agent runs continuously so that the data available to mobile applications running on the device will be as up-to-date as possible. When the Agent is started, the local data source that the Agent is to monitor is specified along with the policy that the Agent will use to drive the data synchronization process.

The Agent, while running, monitors network connectivity and keeps track of the network characteristics. This information is persisted as name-value pairs and can be referenced from rules specified in a custom policy.

The Agent is responsible for implementing the specified policy and driving the synchronization process. It is the Agent that implements pre-defined policies. When a custom policy is specified, a rules engine running inside the Agent is used to execute the rules. Execution of the rules determines when data synchronization occurs.

The Agent is responsible for listening for notifications from the server that data is waiting to be delivered to the mobile device (this class of notifications is called push notifications). Depending on the policy being used, this will cause data synchronization to occur. When a push notification is received and a scheduled policy is being used, an attempt to synchronize will be triggered at the next time interval. When an automatic policy is used, an attempt to synchronize will be triggered immediately. When an on-demand policy is used, the application will be notified of the event. The application can then decide whether to trigger an attempt to synchronize. When a custom policy is used, an attempt to synchronize will be triggered if any of the rules specified by the custom policy are satisfied.

The Agent sends presence information to the server. Presence information includes network status information (current network in use, network address, etc.) and location-based co-ordinates. Network status information is used by the server to send push notifications to the device. Location-based co-ordinates are used by server-side business logic, for example, to deliver location-based content to the device.

Additional information regarding background policy-based data synchronization according to embodiments of the invention are provided in pending U.S. patent application titled "System and Methodology for Extending Enterprise Messaging Systems to Mobile Devices," Ser. No. 10/906,065, filed Feb. 1, 2005, which is herein incorporated by reference in its entirety.

8. Persistent Query System for Automatic On-Demand Data Subscriptions from Mobile Devices This section describes embodiments of the invention for synchronizing a remote database (such as the enterprise database 108) with a local database (such as a local database in a mobile device 212). These embodiments are further described in the above referenced application "Persistent Query System for Automatic On-Demand Data Subscriptions from Mobile Devices," which is herein incorporated by reference in its entirety.

Synchronization allows mobile devices 212 to receive the most current data available from the enterprise and its data sources 208, as well as upload its most currently available data to the enterprise, for any given application or set of applications. "Data" as used herein may be any object, including, but not limited to, information in any form (text, video, audio, etc.) and applications.

As noted above, typically, a mobile device 212 is unable to replicate every piece of data contained in enterprise database 108 in its own local database. This was referred to above as the mapping data paradigm 104 (see FIG. 1). The mobile device may also be unable to constantly query enterprise database 108 in order to obtain the most current data. According to an embodiment of the invention, mobile device 104 can create a data subscription in order to attempt to retrieve relevant data from enterprise database 108 into its local database in order to resolve future queries locally.

Accordingly, the invention includes a system, computer program product, and method for creating a data subscription to a remote database. The method includes the steps of creating a meta-data definition of a table, the table located within the remote database, marking a query to be performed on the table, within the definition, as persistent, and generating a persistent query entity based on the definition, wherein the persistent query entity is mapped to a persistent query table in a local database.

The invention furthermore includes a system, computer program product, and method for creating a persistent query, wherein a table in a remote database is represented by a meta-data definition. The method includes the steps of identifying, in the definition, a query to be performed on the table, wherein the query has been marked as a subscribed query, defining a persistent query entity for the subscribed query, mapping the persistent query entity to a persistent query table, and generating query code, the query code operable to perform the query on a local database.

The invention further includes a system, computer program product, and method for synchronizing a local database with a remote database. According to an embodiment, this is achieved by selecting rows from the remote database by joining the table with the persistent query table, and downloading the selected rows to the local database (in an embodiment, such operation creates a copy of the table in the local database). In an embodiment, the set of selected rows includes only rows modified or subscribed to since the last synchronization. In an embodiment, the steps of selecting rows and downloading the selected rows are implemented in a download cursor.

In creating a meta-data definition (i.e., entity) of a table, it is also possible to define a relationship between two such entities. In accordance with an embodiment of the present invention, this is accomplished by modeling an entity's attributes as having a data type which is another entity or a list (e.g., array) of other entities.

The invention also includes embodiments for deleting rows from the mobile device 212's local database. A deletion, in the context of the present invention, takes on two forms: a complete deletion, which not only deletes the row from the local database, but also marks the row for deletion at the enterprise database 108; and an "eviction," which deletes a row from local database to free space, but does not disturb the equivalent row in enterprise database 108. In an embodiment, both forms delete persistent query rows.

The invention also includes embodiments for deleting rows from the enterprise database 108. When a row is deleted from the central database, the process is handled much like with a client-originated deletion, from the point at which the client-deleted row has been synchronized with the enterprise database 108.

The invention also includes embodiments for intelligent prefetch with multiple devices. According to these embodiments, it is possible for multiple mobile devices to be associated with a particular user. A user need not be an individual, but may also be a group of individuals, such as a team, division, or corporation. The invention includes embodiments by which subscriptions can be optimized for multiple devices controlled by a single user. In accordance with an embodiment of the present invention, a user is able to move between devices and, with at most a single synchronization, be confident that the data available at the current mobile device includes any data the user was recently working with. Subscriptions are associated with the particular user rather than with each individual mobile device.

The invention also includes embodiments for intelligent prefetch with inherited subscriptions. Sometimes it becomes known, perhaps by virtue of optimization testing on an application performing queries on a database, that when a query is performed on a particular data set, a query on a second data set is likely to follow. In the case of a configuration where a mobile device 212's local database only has a subset of the data available in enterprise database 108, performance benefits may be realized by retrieving not only data related to the first query, but also the second query, and storing this data in local database. The invention includes an embodiment for performing this optimization through the use of inherited subscriptions.

The invention also includes embodiments for intelligent prefetch with cascading subscriptions. A mobile device 212 is usually capable of running multiple applications, often simultaneously. Each of these applications may access, either in turn or simultaneously, the mobile 212's local database. As each application may serve a different purpose, the optimization needs for each application may vary. The optimization needs may include, for example, precisely what data each application needs to retrieve from enterprise database 108 into the local database during a synchronization. Accordingly, the invention includes an embodiment whereby subscriptions can be defined in a cascading manner for multiple applications.

More information on these embodiments is provided in the above referenced application "Persistent Query System for Automatic On-Demand Data Subscriptions from Mobile Devices."

9. Programming System for Occasionally-Connected Mobile Business Applications This section describes additional embodiments of the invention for synchronizing a remote database (such as the enterprise database 108) with a local database (such as a local database in a mobile device 212). These embodiments are further described in the above referenced application "Programming System for Occasionally-Connected Mobile Business Applications," which is herein incorporated by reference in its entirety.

According to the invention, a developer uses a programming system to create XML files which are processed by a code generator to create generated files. These generated files include, for example, code files, persistence files, and deployment files. In accordance with an embodiment of the present invention, the developer creates custom-developed code, which is then combined with generated files. These generated files form the basis of software running on a mobile device 212 used to interact with the mobile 212's local database and synchronize with enterprise database 108.

The programming system generates code for execution on mobile device 212 by creating XML class definitions. The code generator is run on the XML files. Thereafter, output code, persistence logic and presentation logic are generated.

In accordance with an embodiment of the present invention, a class definition includes parameter, attribute, and operation definitions. Parameters, attributes, and potentially other definition types optionally specify a data type. In accordance with an embodiment of the present invention, built-in data types are specified which have known equivalents in one or more target platforms (e.g., Java, C#).

A service class is an extension of this basic class. Service classes can be used to support business operation replay for the purposes of synchronizing databases, such as a mobile's local database and the enterprise database 108. Business operation replay allows a service class to perform a set of operations against local database, and, rather than uploading a copy of the results to enterprise database 108, instead captures the operations themselves and replays them against enterprise database 108.

Additionally, change sets of the operations are captured, in accordance with an embodiment of the present invention. Change sets indicate that an entity has been modified by an operation. When the operations are replayed against enterprise database 108, a conflict may arise whereby fewer data rows are modified in enterprise database 108 than on the local database in mobile device 212 such as, for example, when an operation is dependent on another data row which has been modified directly at the enterprise database 108 or by a different mobile device. If the change sets show that additional row insertions, deletions, or updates were made in the local database that are not reflected in enterprise database 108, then a "harmless update" is issued against the additional rows at the enterprise database 108. When enterprise database 108 next synchronizes with mobile device 212, all rows in the local database will have data that matches that in enterprise database 108.

Accordingly, the invention includes a system, computer program product and method for synchronizing a local database with a remote database. The method includes the steps of defining a service operation, wherein the service operation comprises a transaction, processing the transaction on the local database, capturing operation calls performed by the transaction, and capturing change sets of the transaction.

The invention furthermore includes a system, computer program product and method for performing a service operation on a database, the database located on a database system. The method includes the steps of defining a service operation, wherein the service operation comprises a transaction, determining a target environment for the database system, and processing the transaction on the database, wherein the transaction is selected from a set of transactions, the transaction corresponding to the target environment.

More information on these embodiments is provided in the above referenced application "Programming System for Occasionally-Connected Mobile Business Applications."

10. Context-Based Data Pre-Fetching and Notification for Mobile Applications

As mobile computing platforms become increasingly ubiquitous, and with the availability of network access for the mobile computing platforms, it becomes desirable to provide users with as close an approximation to the experience of a full-featured computing platform as possible. In order to conserve space and battery power, mobile computing platforms, such as personal digital assistants ("PDAs"), frequently have small display screens, limited memory, limited processing power, and limited communications bandwidth. Such resource restrictions of mobile computing platforms are often incompatible with the goal of providing users with a data needed by the users to enjoy a full-featured experience.

Mobile applications require data to be mobilized from the enterprise and stored on a mobile device for occasional disconnected computing while the device is not connected to the enterprise network. However, as the mobile devices are often resource restricted, the set of data downloaded to the devices is limited to a subset of what is available on enterprise servers and devices (see the mapping data paradigm 104 in FIG. 1). In addition, the subset of enterprise data needed on mobile devices must be determined a priori. At times, the pre-determined subset of data is insufficient to meet the mobile user's needs. Necessary data is unavailable on mobile devices when unplanned and planned changes are not accounted for. Without necessary data available at the mobile devices, corresponding mobile applications can be rendered difficult to use or inoperable, depending on network connectivity.

In traditional enterprise computing environments, users are able to request data (i.e., fetch data and query databases) when it is needed and receive a timely response with the subset of data they have requested. In the mobile environment, this traditional request/response paradigm does not always work due to potential connectivity problems of 'roaming' mobile devices, and/or to characteristics of multiple diverse networks 118. The focus of attention for a mobile user and the corresponding mobile applications is on the task currently being performed so it is not reasonable to expect mobile users or applications to determine what data is necessary to complete the task. Hence, pertinent information should be 'pushed' to the mobile user's applications rather than requiring them to 'pull' the information from enterprise servers. Relevant data and notifications must be provided at the appropriate time to mobile devices for to enable mobile users to make time sensitive business decisions. This is because mobile users oftentimes do not know when and what subset of data is needed as they are not aware of the situation or 'context' they are currently in.

Accordingly, the invention includes embodiments to dynamically determine the likely set of data needed on a mobile computing platform based on the context of the mobile applications on the platform and the user using the platform. The invention also includes embodiments to provide relevant data and notifications at the appropriate time to a mobile computing platform based on the context of the mobile applications on the platform.

Figure 14:
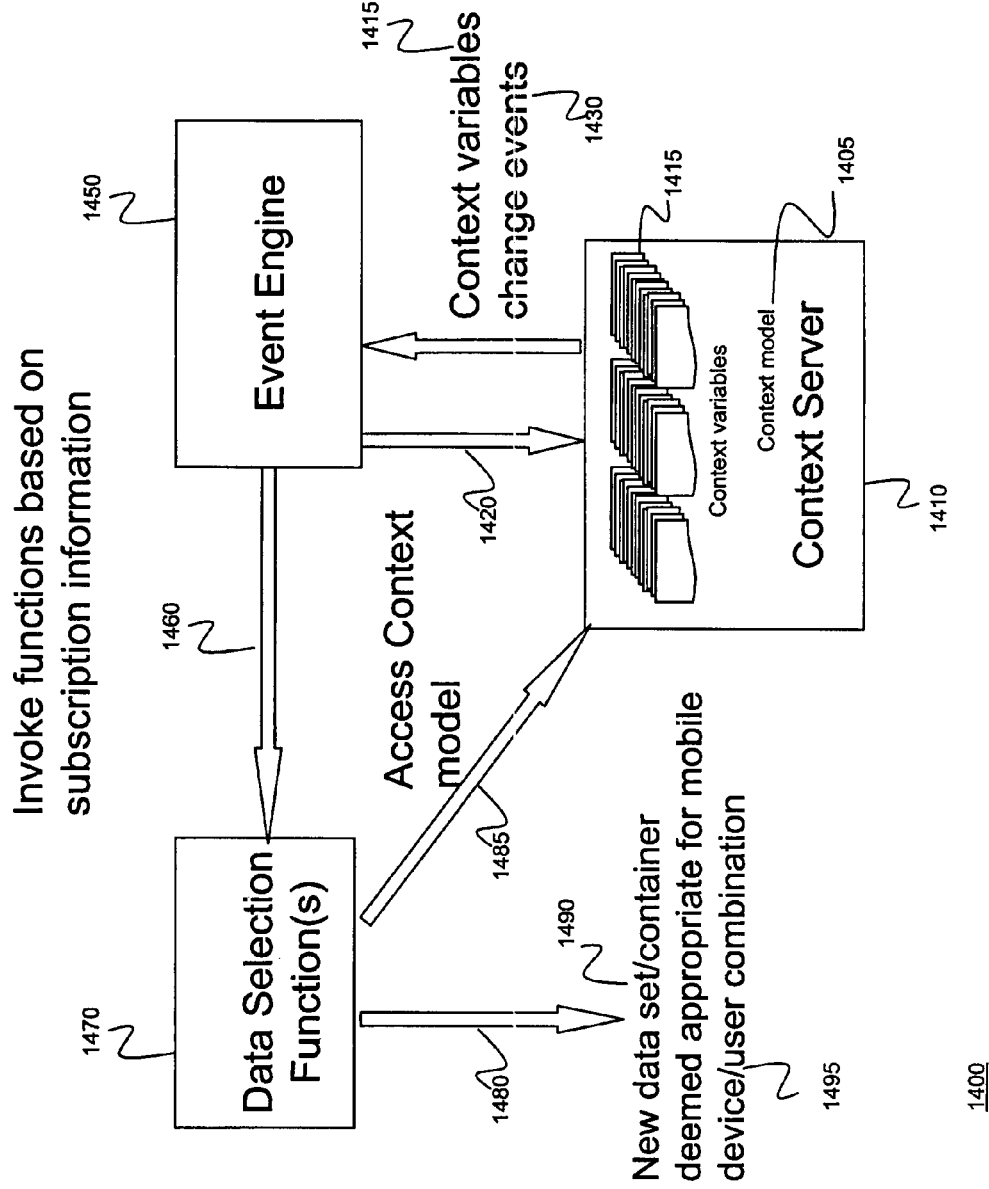
FIG. 14 illustrates the operation of context-based data prefetching and notification for mobile applications, in accordance with an embodiment of the present invention.

FIG. 14 provides a flowchart of Context-based data prefetching and notification 1400 for mobile applications, in accordance with an embodiment of the present invention.

Context model 1405 represents the situational information of the mobile user. Context model 1405 is defined using ontology. Each context model has a set of concepts as well as the relationships between them, expresses in context variables.

Context variables 1415 can be simple or derived by aggregating through inferences of simple variables. Context variables 1415 may include simple context variables which may contain a collection of values.

In order to facilitate "delta-based data updating" (i.e., sending out only information that user does not already have), context model 1405 stores what is already on the device as one or more context variables 1415. Context variables 1415 are part of context model 1405.

There can be many context models 1405 within context server 1410. Context server 1410 maintains the context models. It does so by polling or receiving updates from physical sensors or software-based information for simple variables. Changes in the simple variables will trigger inference to update derived variables.

Context server 1410 provides a context query API to access context variables 1415 within context model 1405.

Data selection functions 1470 are functions that calculate the prefetch data for the mobile applications and users. Data selection functions 1470 may leverage context variables 1415 within context model 1405. For each mobile user/device combination 1495, there can be a set of data selection functions

1470. The output of each function is combined to form new data set 1490. Data selection functions 1470 may use inference (e.g. rules or Bayesian network) to perform the calculation of the data set 1490 required by each mobile user/device combination 1495. Data selection functions 1470 also access Context model 1485 from context server 1410.

In accordance with an embodiment of the invention, Data selection functions 1470 access Context model 1485 that represents the mobile user's context to determine the new data set 1490 required by each mobile user/device combination 1495.

Each user/device combination 1495 may subscribe to a set of context variables 1415 within context model 1405. Whenever context variables 1415 within the subscription 1420 changes, event engine 1450 will determine and execute the affected sets of Data Selection functions 1470. The new data set 1490 created by the functions will be compared with what is already on the device, stored as context variables 1415, to create a "delta" set of data 1480 that the mobile user/device combination 1495 does not already have.

Event engine 1450 is also responsible for receiving notifications/updates 1420 from sensors and software event mediator and forwards them to context server 1410 to maintain context models 1405.

FIG. 14 also illustrates a method for delivering relevant data and notification at the appropriate times to mobile applications using context-based pre-fetching method described above, in accordance with an embodiment of the present invention.

Notifications and data 1480 delivered to mobile user/device combination 1495 have the following characteristics.

Data set 1490 is packaged with metadata into a "metadata driven container" to assist in displaying the data at the mobile device and the metadata contains a description of data 1480.

Data set 1490 has an identifier with a timestamp, thus data set 1490 is named and versioned.

All versions of data set 1490 with the same identifier are unique.

Policies on mobile device 1495 supports having only one or multiple versions of data set 1490 per identifier.

No modification of data set 1490 is allowed, data 1480 is provided to mobile user/device combination 1495 only for reference.

Data set 1490 includes both structured and unstructured data.

Data set 1490 requires a client side container to interpret the data set "package" and display it appropriately at mobile device 1495.

Data set 1490 can be acknowledged and discarded by mobile device/user combination 1495 or after a predetermined time (i.e., a "timeout period") according to a policy on mobile device 1495

Data 1480 is generated from mobile device/user combination 1495 specified data selection functions 1470 that are subscribed to context variables 1415 within context model 1405.

The metadata driven data set/container 1490 uses the metadata within the data set 1490 to determine how best to display the data 1480. Data container 1490 is context aware (i.e., aware of the environment that it is executed under such as the characteristics of mobile device/user combination 1495). Hence, data container 1490 can render data 1480 in a fashion that is most suitable for the device.

When data 1480 is reviewed by user 1495, it can be deleted from the mobile device 1495. In addition, if data set 14190 has an expiration date set, it will be discarded when appropriate.

Relevant data 1480 can be pushed to mobile device/user combination 1495 based upon changes in the context 1460 that the Data Selection Functions 1470 subscribed to.

Change in context 1430 (context variables 1415 within context model 1405) can be caused by changes occurring within the enterprise such as changes in data, execution of business processes, or other change events 1430. These change events 1430 are reported to Event Engine 1450 which notifies Context Server 1410 to update context model 1405.

Change events 1430 can also be caused by a mobile device/user 1495 triggering a change in context by user actions with mobile applications running on mobile device 1495, natural language commands/queries through messaging or short messaging service (SMS), and device sensor readings.

More information on the embodiments described in this section is provided in the above referenced application "System, Method, and Computer Program Product for Context-Based Data Pre-Fetching and Notification for Mobile Applications," which is herein incorporated by reference in its entirety.

11. Example Computer Implementation

Figure 13:
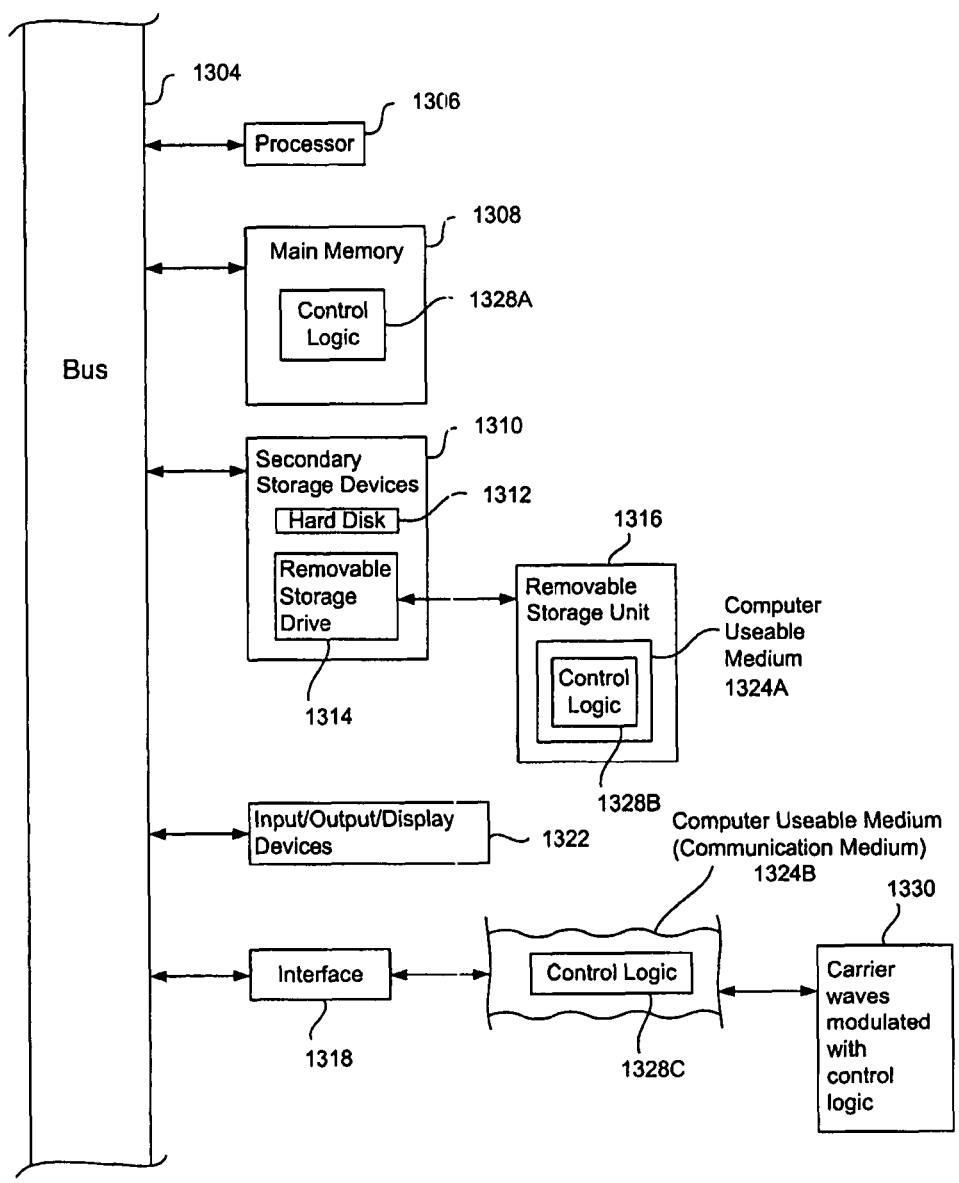
FIG. 13 illustrates an example computer useful for implementing components of the invention.

In an embodiment of the present invention, the system and components of the present invention described herein are implemented using well known computers, such as computer 1302 shown in FIG. 13.

The computer 1302 can be any commercially available and well known computer capable of performing the functions described herein, such as computers available from International Business Machines, Apple, Sun, HP, Dell, Compaq, Digital, Cray, etc.

The computer 1302 includes one or more processors (also called central processing units, or CPUs), such as a processor 1306. The processor 1306 is connected to a communication bus 1304.

The computer 1302 also includes a main or primary memory 1308, such as random access memory (RAM). The primary memory 1308 has stored therein control logic 1328A (computer software), and data.

The computer 1302 also includes one or more secondary storage devices 1310. The secondary storage devices 1310 include, for example, a hard disk drive 1312 and/or a removable storage device or drive 1314, as well as other types of storage devices, such as memory cards and memory sticks. The removable storage drive 1314 represents a floppy disk drive, a magnetic tape drive, a compact disk drive, an optical storage device, tape backup, etc.

The removable storage drive 1314 interacts with a removable storage unit 1316. The removable storage unit 1316 includes a computer useable or readable storage medium 1324 having stored therein computer software 1328B (control logic) and/or data. Removable storage unit 1316 represents a floppy disk, magnetic tape, compact disk, DVD, optical storage disk, or any other computer data storage device. The removable storage drive 1314 reads from and/or writes to the removable storage unit 1316 in a well known manner.

The computer 1302 also includes input/output/display devices 1322, such as monitors, keyboards, pointing devices, etc.

The computer 1302 further includes a communication or network interface 1318. The network interface 1318 enables the computer 1302 to communicate with remote devices. For example, the network interface 1318 allows the computer 1302 to communicate over communication networks or mediums 1324B (representing a form of a computer useable or readable medium), such as LANs, WANs, the Internet, etc.

The network interface 1318 may interface with remote sites or networks via wired or wireless connections.

Control logic 1328C may be transmitted to and from the computer 1302 via the communication medium 1324B. More particularly, the computer 1302 may receive and transmit carrier waves (electromagnetic signals) modulated with control logic 1330 via the communication medium 1324B.

Any apparatus or manufacture comprising a computer useable or readable medium having control logic (software) stored therein is referred to herein as a computer program product or program storage device. This includes, but is not limited to, the computer 1302, the main memory 1308, the secondary storage devices 1310, the removable storage unit 1316 and the carrier waves modulated with control logic 1330. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

12. Appendix

The attached Appendix forms a part of this application, and is thus herein incorporated by reference in its entirety.

13. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a server of inherently integrating mobility with an enterprise, comprising:
   accessing enterprise data from one or more data sources available to and utilized by a plurality of enterprise applications or business processes;
   transferring said enterprise data to at least one of a plurality of mobile devices over a plurality of diverse networks, wherein said transferring takes into consideration persisted characteristics of said diverse networks affecting data transfer, including at least one of network reliability, bandwidth, latency, and connectivity;
   receiving data generated by said at least one mobile device while performing enterprise-related operations, processes, or tasks at a wireless edge; and
   responding to environmental changes using said received data to change said enterprise data, wherein the response includes at least said received data, and wherein said environmental changes are indicated by:
   a global positioning system (GPS);
   said diverse networks, wherein said diverse networks include at least one wireless network, and wherein said environmental changes include indications of a current network in use by said at least one mobile device and a network address assigned to said at least one mobile device;
   sensor readings from said at least one mobile device; and
   characteristics of said at least one mobile device.

2. The method of claim 1, wherein said data sources comprise structured and unstructured data sources.

3. The method of claim 1, wherein said transferring and receiving comprise:
   synchronizing said enterprise data and said received data generated by said at least one mobile device between said enterprise and said at least one mobile device according to a background policy-based data synchronization process.

4. The method of claim 3, wherein said background policy-based data synchronization process comprises a plurality of policies that define how background synchronization takes place, wherein said policies comprise at least one of a scheduled policy, an automatic policy, an on-demand policy, and a custom policy.

5. The method of claim 1, wherein said transferring and receiving comprise synchronizing a local database with a consolidated database, said synchronization comprising a mobile device performing:
   defining a service operation, wherein the service operation comprises a transaction;
   processing the transaction on the local database;
   capturing operation calls performed by the transaction; and
   capturing change sets of the transaction.

6. The method of claim 1, further comprising:
   creating a data subscription to a consolidated database.

7. The method of claim 6, wherein said data subscription creating comprises a mobile device performing:
   creating a meta-data definition of a table, the table located within the remote database;
   marking a query to be performed on the table, within the definition, as persistent; and
   generating a persistent query entity based on the definition, wherein the persistent query entity is mapped to a persistent query table in a local database.

8. The method of claim 1, further comprising creating a persistent query, wherein a table in a consolidated database is represented by a meta-data definition, said persistent query creating comprising a mobile device performing:
   identifying, in the definition, a query to be performed on the table, wherein the query has been marked as a subscribed query;
   defining a persistent query entity for the subscribed query;
   mapping the persistent query entity to a persistent query table; and
   generating query code, the query code operable to perform the query on a local database.

9. The method of claim 1, further comprising:
   context-based data pre-fetching and notification for mobile applications.

10. The method of claim 9, wherein said context-based data pre-fetching and notification comprises:
    creating a context model;
    updating context variables within the context model that can be used by a mobile application;
    determining a set of data for the mobile application that will leverage context variables from the context model;
    maintaining inference engines used by data selection functions to arrive at a likely set of data needed by the mobile application;
    maintaining the context model;

subscribing to changes in context variables for mobile user/device combinations; and executing data selection functions to calculate a data set for the mobile application.

11. The method of claim 1, further comprising:

provisioning applications to mobile devices wherein said provisioning integrates said provisioned applications, said mobile devices and enterprise security.

12. The method of claim 1, further comprising:

enabling integration of meta-data between development and deployment layers for platform requirements.

13. A computer useable storage medium having computer program logic stored thereon that when executed by a processor, causes the processor to perform operations to integrate mobility with an enterprise, the operations comprising:

accessing enterprise data from one or more data sources available to and utilized by a plurality of enterprise applications or business processes;

transferring said enterprise data to at least one of a plurality of mobile devices over a plurality of diverse networks while taking into consideration persisted characteristics of said diverse networks affecting data transfer, including at least one of network reliability, bandwidth, latency, and connectivity;

receiving data generated by said at least one mobile device while performing enterprise-related operations, processes, or tasks at a wireless edge; and responding to environmental changes using said received data to change said enterprise data, wherein the response includes at least said received data, and wherein said environmental changes are indicated by:

a global positioning system (GPS);

said diverse networks, wherein said diverse networks include at least one wireless network, and wherein said environmental changes include indications of a current network in use by said at least one mobile device and a network address assigned to said at least one mobile device;

sensor readings from said at least one mobile device; and characteristics of said at least one mobile device.

14. The computer useable storage medium of claim 13, wherein said data sources comprise structured and unstructured data sources.

15. The computer useable storage medium of claim 13, wherein said transferring and receiving comprise:

synchronizing said enterprise data and said received data generated by said at least one mobile device between said enterprise and said at least one mobile device according to a background policy-based data synchronization process.

16. The computer useable storage medium of claim 15, wherein said background policy-based data synchronization process comprises a plurality of policies that define how background synchronization takes place, wherein said policies comprise at least one of a scheduled policy, an automatic policy, an on-demand policy, and a custom policy.

17. The computer useable storage medium of claim 13, wherein said transferring and receiving comprise:

synchronizing a local database with a consolidated database, comprising:

defining a service operation, wherein the service operation comprises a transaction;

processing the transaction on the local database;

capturing operation calls performed by the transaction; and capturing change sets of the transaction.

18. The computer useable storage medium of claim 13, the operations further comprising:

creating a data subscription to a consolidated database.

19. The computer useable storage medium of claim 18, wherein said data subscription creating comprises:

creating a meta-data definition of a table, the table located within the remote database;

marking a query to be performed on the table, within the definition, as persistent; and generating a persistent query entity based on the definition, wherein the persistent query entity is mapped to a persistent query table in a local database.

20. The computer useable storage medium of claim 13, the operations further comprising:

creating a persistent query, wherein a table in a consolidated database is represented by a meta-data definition, comprising:

identifying, in the definition, a query to be performed on the table, wherein the query has been marked as a subscribed query;

defining a persistent query entity for the subscribed query;

mapping the persistent query entity to a persistent query table; and generating query code, the query code operable to perform the query on a local database.

21. The computer useable storage medium of claim 13, the operations further comprising:

performing context-based data pre-fetching and notification for mobile applications.

22. The computer useable storage medium of claim 21, wherein said context-based data pre-fetching and notification comprises:

creating a context model;

updating context variables within the context model that can be used by a mobile application;

determining a set of data for the mobile application that will leverage context variables from the context model;

maintaining inference engines used by data selection functions to arrive at a likely set of data needed by the mobile application;

maintaining the context model;

subscribing to changes in context variables for mobile user/device combinations; and executing data selection functions to calculate a data set for the mobile application.

23. The computer useable storage medium of claim 13, the operations further comprising:

provisioning applications to mobile devices wherein said provisioning integrates said provisioned applications, said mobile devices and enterprise security.

24. The computer useable storage medium of claim 13, the operations further comprising:

integrating meta-data between development and deployment layers for platform requirements.

25. A system of inherently integrating mobility with an enterprise, comprising:

one or more processors;

a server-based module configured to access, using the one or more processors, enterprise data from one or more data sources available to and utilized by a plurality of enterprise applications or business processes;

a server-based module configured to transfer, using the one or more processors, said enterprise data to at least one of a plurality of mobile devices over a plurality of diverse networks, wherein said transferring takes into consideration persisted characteristics of said diverse networks affecting data transfer, including at least one of reliability, bandwidth, latency, and connectivity;
a server-based module configured to receive, using the one or more processors, from said at least one mobile device data generated by said mobile devices while performing enterprise-related operations, processes, or tasks at a wireless edge; and
a server-based module configured to respond, using the one or more processors, to environmental changes using said received data to change said enterprise data, wherein the response includes at least said received data, and wherein said environmental changes are indicated by:
a global positioning system (GPS);
said diverse networks, wherein said diverse networks include at least one wireless network, and wherein said environmental changes include indications of a current network in use by said mobile devices and a network address assigned to said at least one mobile device;
sensor readings from said at least one mobile device; and
characteristics of said at least one mobile device.

26. The system of claim 25, wherein said environmental changes are further indicated by one or more of:
user actions within mobile applications running on said at least one mobile device;
a short messaging service (SMS) message; or
an email message.

* * * * *

UNITED STATES PATENT AND TRADEMARK OFFICE
CERTIFICATE OF CORRECTION

PATENT NO. : 8,204,870 B2  Page 1 of 1
APPLICATION NO. : 11/882749
DATED : June 19, 2012
INVENTOR(S) : Mukkamala et al.

It is certified that error appears in the above-identified patent and that said Letters Patent is hereby corrected as shown below:

Title Page
Item (56), References Cited, U.S. Patent Documents section, for U.S. Pat. 6,636,873, replace "Merchant et al." with --Carini et al.--.

Signed and Sealed this
Fourth Day of September, 2012

David J. Kappos
*Director of the United States Patent and Trademark Office*